(12) United States Patent
Chew

(10) Patent No.: US 8,035,307 B2
(45) Date of Patent: Oct. 11, 2011

(54) AC TO DC LED ILLUMINATION DEVICES, SYSTEMS AND METHODS

(75) Inventor: Tong Fatt Chew, Penang (MY)

(73) Assignee: GT BiomeScilt Light Limited, Kowloon (HK)

( * ) Notice: Subject to any disclaimer, the term of this patent is extended or adjusted under 35 U.S.C. 154(b) by 464 days.

(21) Appl. No.: 12/290,746

(22) Filed: Nov. 3, 2008

(65) Prior Publication Data

US 2010/0109558 A1    May 6, 2010

(51) Int. Cl.
    *H05B 37/02*    (2006.01)
(52) U.S. Cl. .................. 315/200 R; 315/294; 315/192; 315/193
(58) Field of Classification Search .............. 315/200 R, 315/294, 192, 193, 307
    See application file for complete search history.

(56) References Cited

U.S. PATENT DOCUMENTS

| | | | |
|---|---|---|---|
| 5,442,258 A | 8/1995 | Shibata | |
| 6,072,280 A | 6/2000 | Allen | |
| 6,461,019 B1 | 10/2002 | Allen | |
| 6,487,098 B2 | 11/2002 | Malik et al. | |
| 6,600,670 B2 | 7/2003 | Morita et al. | |
| 6,636,027 B1 | 10/2003 | Nerone | |
| 6,830,358 B2 | 12/2004 | Allen | |
| 6,867,575 B2 | 3/2005 | D'Cunha | |
| 7,066,628 B2 | 6/2006 | Allen | |
| 7,250,730 B1 | 7/2007 | Allen | |
| 7,272,018 B2 | 9/2007 | Yamada et al. | |
| 7,344,275 B2 | 3/2008 | Allen et al. | |
| 7,397,384 B1 | 7/2008 | Mackenzie, IV et al. | |
| 7,564,198 B2 * | 7/2009 | Yamamoto et al. ........... | 315/307 |
| 2007/0273299 A1 | 11/2007 | Miskin et al. | |
| 2008/0094828 A1 | 4/2008 | Shao | |

FOREIGN PATENT DOCUMENTS

| | | |
|---|---|---|
| JP | 2006-351473 | 12/2006 |
| JP | 2008-257993 | 10/2008 |
| JP | 2009-134945 | 6/2009 |
| WO | 2007/089581 | 8/2007 |

OTHER PUBLICATIONS

Sze Chin, "Boosting the Current Limit of Current Limiting Diodes," ECN, Oct. 2007.

* cited by examiner

*Primary Examiner* — Daniel D Chang
(74) *Attorney, Agent, or Firm* — Dilworth & Barrese, LLP

(57) ABSTRACT

Illumination devices (10), systems and methods that convert an alternating current (AC) supply (14) to a direct current (DC) for powering a plurality of light emitting diodes (LEDs) are disclosed. An illumination device (10) comprises a full wave rectifier (12) for converting the AC supply into a direct current (DC). A current limiting diode (CLD) module (16), comprising at least two CLDs coupled in parallel, is coupled in series to an output of the full wave rectifier and a light emitting diode (LED) module (18) comprising a plurality of LEDs is coupled in series between an output of the CLD module (16) and the full wave rectifier (12).

28 Claims, 14 Drawing Sheets

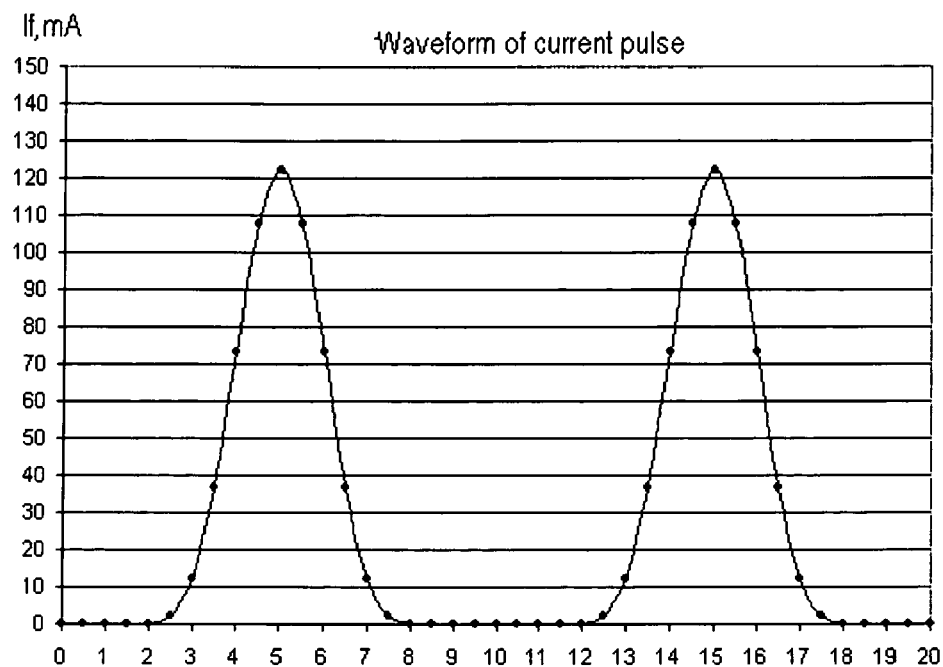
FIG 1 – PRIOR ART
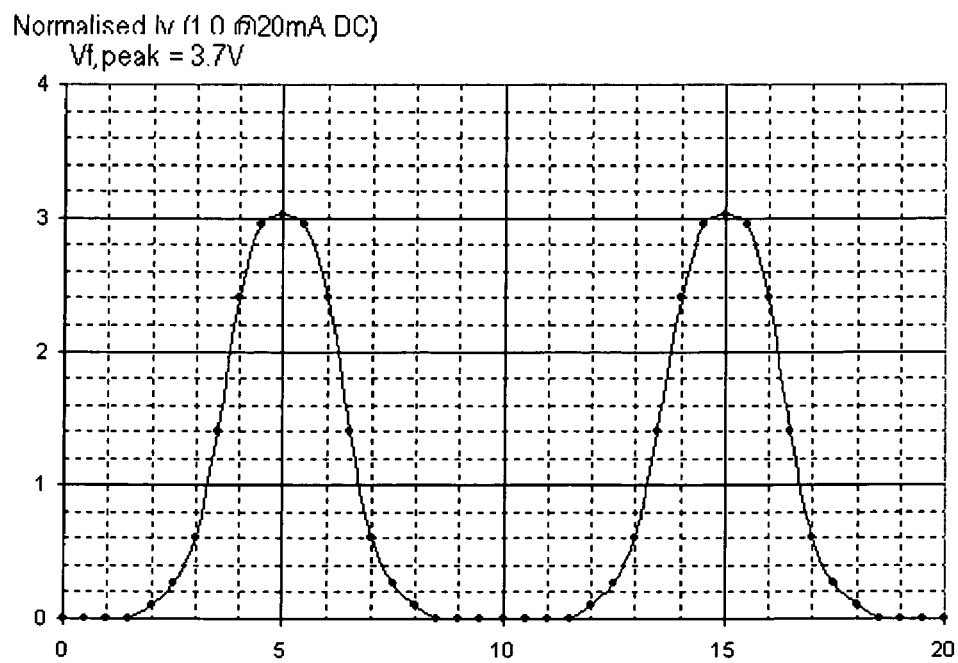
FIG 2 – PRIOR ART

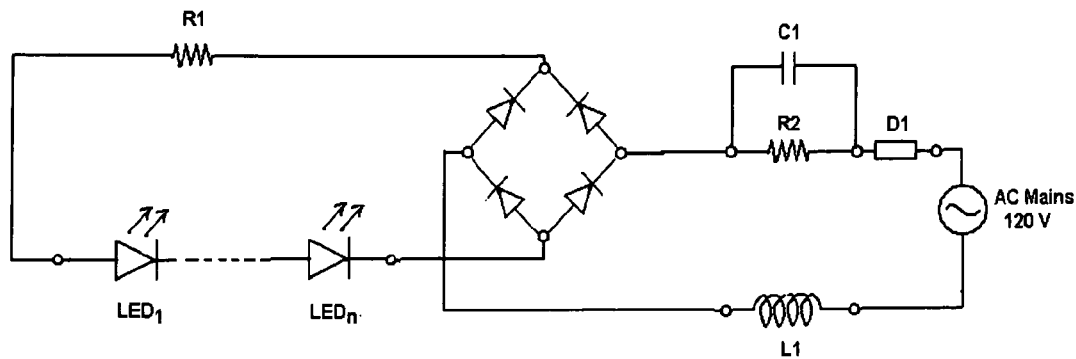
FIG 3 – PRIOR ART
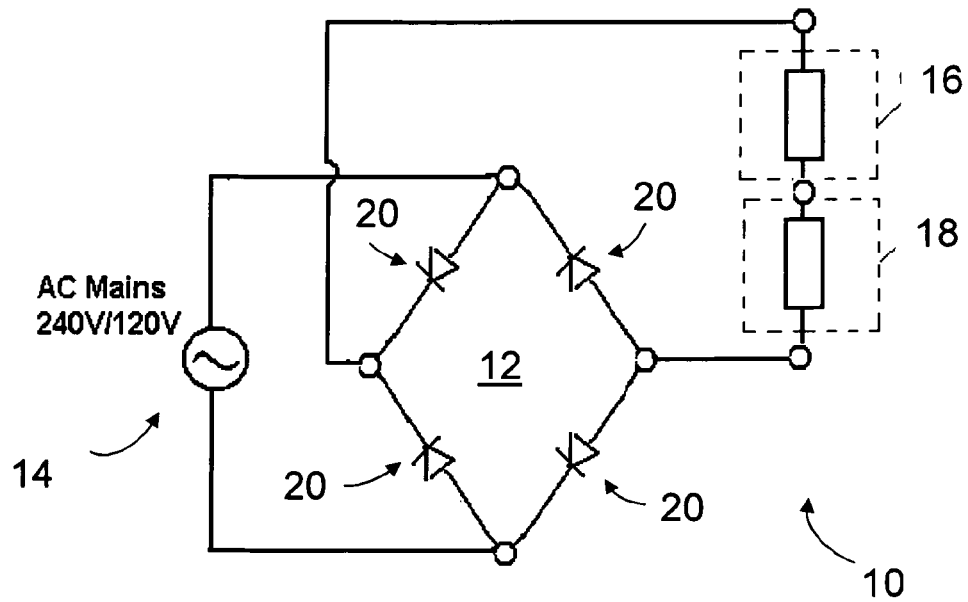
FIG 4

18

18

18

18

CLD block with rotary switch
(Method of non-resistive switching)

AC TO DC LED ILLUMINATION DEVICES, SYSTEMS AND METHODS

FIELD OF THE INVENTION

Embodiments of the present invention relate generally to illumination devices, systems and methods that convert an alternating current (AC) to a direct current (DC) for powering one or more light emitting diodes (LEDs).

BACKGROUND TO THE INVENTION

The rapid development in LED efficiency in recent years has resulted in the adoption of LEDs in illumination applications, replacing incandescent bulbs in many applications and beginning to replace cold cathode fluorescent lamps (CCFLs) and fluorescent tube lamps in some specialty lighting applications. Whereas LED applications in the non-illumination sectors have many well established designs for drive circuitry, the same cannot be said for LEDs operated directly from the mains power supply. Unlike other applications, LED lamp products used for illumination have to compete against incandescent lamps and CCFLs with low entry cost. As such, it is not very competitive to use expensive drive circuitry to operate LED lamps off the mains because the replacement cost versus other lamp technologies will be higher and the payback time will be longer.

In non-illumination applications, usually there is a readily available low voltage power supply. This, plus the use of constant current drivers, enables a rather cheap solution to drive LEDs in instrumentation and displays in many end applications. For LEDs to be operated from the mains directly, the first challenge is the cost of the AC to DC power adapter. In the current state of art, a good power adapter for LED operation with a constant current source is almost half the cost of the overall LED lamp. Typically a switched mode power supply is implemented. Other existing LED power supply schemes include half-wave rectification, full wave rectification and rectification with smoothing capacitors and inductors. However, these schemes introduce the problems of lower power factor and high total harmonic distortion to the power supply.

Power adapters with constant current drivers typically use a switch mode power supply together with circuitry to generate a constant current for driving LEDs. While the constant DC current provides efficient LED operation, the drive circuit and power adapter have a high component count and consequently a high cost is involved. In addition, a large amount of space is taken up by this design due to the size and number of components used. This is rather undesirable when the power adapter and drive circuit have to be fitted into the size of a conventional light bulb.

Full wave rectification circuit power adapters and drive schemes have an advantage over the switch mode power supply in that they have fewer components and therefore require less space and are relatively low cost. However, one limitation of this design is that the voltage and current follow half-sinusoidal waveforms, which are not suitable for driving LEDs.

Half-wave rectification is not competitive due to low light output as a result of missing half a cycle of operation in DC mode. While this can be rectified by providing additional LEDs in the circuit to operate in the reverse cycle, the cost of the LEDs is doubled.

A typical LED, such as an InGaN LED, typically has a near zero forward current until the turn-on voltage followed by a steep rise in forward current for a small increase in voltage. In a typical design, the forward voltage is designed to be at the maximum allowable through the LED at peak cycle. The resultant average drive current for the whole cycle is much lower than that of the DC drive current. This is partly due to the high turn-on voltage of the LED and this results in lower flux output for a full wave rectification-based LED module.

The waveform of the current and voltage generated by the full wave rectification circuit is not optimal in light output efficiency in terms of lumens per watt of the system. This is because only a small part of the power cycle is at the maximum allowable drive current and consequently only a small part of the power cycle is, at the maximum light output, as shown in FIG. 1. The time-average light output is much lower than in DC mode. Moreover, the LED is constrained in the maximum voltage and maximum drive current it can tolerate without creating electrical overstress. Full wave rectification without modification of the sinusoidal forward voltage and forward current waveforms would severely limit the drive current through the LEDs throughout much of the power cycle, resulting in a rather low overall average DC current and low average power. FIG. 2 shows an example of the luminous intensity (lv) waveform resulting from a full wave rectified power supply. For about 40% of the duration of the power cycle, the light output is practically zero and for 70% of the duration of the power cycle, the light output is less than half the peak value.

In conventional bridge rectification circuits, a higher amount of heat is generated due to the elevated forward voltage of the rectified power supply over part of the power cycle, which leads to a higher LED junction temperature. The light output of the LED decreases as the junction temperature rises as a result of the LED thermal characteristics. This leads to a second contribution to light output drop, over and above the effect caused by current saturation in the LED junction.

Some full wave rectification circuits include a filter capacitor which acts to smooth out the variation in the DC waveform. However, the capacitive load causes harmonic distortion to the power supply and there is a drop in the power factor of the system. An example of such a circuit used to drive LEDs directly off the AC mains supply is shown in FIG. 3. The bridge circuit converts the sinusoidal waveform from the AC mains to a full-wave rectified DC waveform. The circuit uses a capacitor C1 and an inductor L1 to smooth the resulting DC waveform, while the value of resistance for resistor R1 is chosen to limit the current flowing through the LEDs $LED_1$ to $LED_n$. Sometimes an over-current protection device D1 is incorporated in the circuit. The main losses of the system include power loss in resistor R2 of the AC-to-DC conversion block and power loss in resistor R1 used to limit the current flowing through the LEDs. In one example of the circuit shown in FIG. 3, six InGaN LEDs with a typical voltage of 3.3V are used in the LED string. In another design, two LED strings, each having six LEDs, are used in parallel. Both of these designs have approximately 20V drop across the LEDs in total with the typical average voltage of 3.3V per LED. The excess of the rectified voltage over the LEDs is taken up by the resistor R1 and dissipated as heat.

U.S. Pat. No. 7,272,018 discloses another prior art power adapter design in the form of a switched mode power supply scheme with power factor correction. The complex circuit has a higher component count and increases the cost of the design to supply DC power to an LED string.

U.S. Pat. No. 6,600,670 discloses another switch mode power supply scheme to provide a constant DC supply, which needs multiple types of components and has a high component count. For a low cost product such as an LED lamp, these schemes are not suitable although the DC power supply quality is good in terms of high power factor and low harmonic distortion to the power supply.

Another problem with driving LEDs directly off the AC mains is the variation in forward voltage of individual LEDs due to their mass production. For example, the operating forward voltage of a white LED typically ranges from about 2.8V to about 3.5V for higher grade LEDs, whilst lower grade LEDs range from about 2.8V up to about 3.9V. When the LEDs are stringed in series, the number of LEDs used needs to be determined precisely. However, due to the variation in the forward voltage from LED to LED, there is a need to specify a narrow forward voltage range for the LEDs. This requirement necessitates tight forward voltage binning for the LEDs. This increases the manufacturing cost of LEDs to cover the cost of rejects in the forward voltage binning process. If no forward voltage binning is performed, there will be a variation of total forward voltage coming from the LEDs, resulting in an increase in light output variation of the LED devices.

As stated above, many circuit designs for powering LEDs from an AC power supply utilize inductive components, such as transformers, inductors or magnetic coils. These components introduce electromagnetic radiation noise and as a result require additional EMI suppression measures in the circuit design. In addition, the magnetic coils cause humming noise in the presence of magnetic parts, for example, in fluorescent tube lighting fixtures.

Further circuit designs for powering LEDs from an AC power supply are disclosed in U.S. Pat. No. 7,344,275, U.S. Pat. No. 7,066,628, U.S. Pat. No. 6,867,575, U.S. Pat. No. 6,830,358, U.S. Pat. No. 6,636,027, U.S. Pat. No. 6,461,019 and U.S. Pat. No. 6,072,280. However, these designs suffer from one or more of the aforementioned problems or drawbacks.

Drawbacks are also encountered with conventional systems for controlling colored LEDs being powered from an AC supply. In conventional LED color control systems, either pulsed width modulation or resistive switches are used to control the color and brightness levels of red, green and blue (RGB) LEDs to produce the color gamut. Pulse width modulation has the advantage of high efficiency in lumens per watt, but a drawback is the need for complex circuitry to implement the color mixing, including the use of LED drivers, color control integrated circuits (ICs), a microprocessor and a power adapter for low voltage supply. Resistive switches utilize series resistance to reduce the current flowing through the LED circuits. Although this method is cheaper and simpler than pulsed width modulation, it reduces the efficiency of the illumination system through heat losses in the series resistance, especially at high dimming levels.

OBJECT OF THE INVENTION

It is an object of the present invention to provide a system and/or method and/or apparatus for powering LEDs from an AC power supply that addresses or at least ameliorates one or more of the aforementioned problems of the prior art or provides consumers with a useful commercial alternative.

SUMMARY OF THE INVENTION

According to one aspect, although not necessarily the broadest or only aspect, embodiments of the present invention reside in an illumination device comprising:

a full wave rectifier for converting an alternating current (AC) supply into a direct current (DC);

a current limiting diode (CLD) module coupled in series to an output of the full wave rectifier, the CLD module comprising at least two CLDs coupled in parallel; and a light emitting diode (LED) module coupled in series between an output of the CLD module and the full wave rectifier, the LED module comprising a plurality of LEDs.

The full wave rectifier is preferably a bridge rectifier comprising a single component or four rectifier diodes in a bridge configuration.

The LED module may comprise at least thirty LEDs in series and/or two or more LEDs in parallel.

The LED module may comprise one or more LED blocks, each LED block comprising two or more LEDs in parallel and/or in series.

The CLD module may comprise at least one switch in series with at least one CLD.

The at least one switch may be a mechanical switch or an electronic switch.

Preferably, the sum of a voltage drop across the CLD module and the LED module is at least 90% of the AC supply voltage.

Suitably, the number of LEDs in the LED module and the number of CLDs in the CLD module are selected to provide a pulsed forward current having pulses comprising flat peaks for at least 10% of the duration of the power cycle.

The illumination device may further comprise a positive temperature coefficient (PTC) resettable fuse coupled in series between the AC supply and an input of the full wave rectifier.

The illumination device may comprise at least two LED modules and at least two CLD modules, each LED module coupled in series to a respective CLD module.

Suitably, each LED module comprises LEDs of a single color.

The illumination device may further comprise:

a connector for connecting the illumination device to the AC supply;

a housing coupled to the connector; and a substrate coupled to the connector within the housing, the plurality of LEDs mounted on the substrate.

Suitably, the at least two CLDs and the full wave rectifier are mounted to the substrate.

Suitably, the at least two CLDs and the full wave rectifier are coupled to the connector and are external to the housing.

The illumination device may further comprise at least one switch in series with at least one of the CLDs, wherein the at least one switch and the CLDs are external to the housing.

The illumination device may comprise:

at least two LED modules and at least two CLD modules, each LED module coupled in series to a respective CLD module, each LED module comprising LEDs of a single color; and a switch coupled in series with each CLD module.

Suitably, the at least one switch is operated via a string or cord coupled to the connector.

The illumination device may further comprise:

a digital switching circuit coupled in series with at least one of the CLDs;

a wireless transmission circuit coupled to the digital switching circuit; and a wireless receiver coupled to the wireless transmission circuit.

Suitably, one or more of the following are provided within the housing: the full wave rectifier; the CLD module, the digital switching circuit; the wireless transmission circuit, the wireless receiver.

According to another aspect, although not necessarily the broadest aspect, embodiments of the present invention reside in an illumination system comprising at least two illumination devices, each illumination device comprising:

a full wave rectifier for converting an alternating current (AC) supply into a direct current (DC);

a current limiting diode (CLD) module coupled in series to an output of the full wave rectifier, the CLD module comprising at least two CLDs coupled in parallel;

a light emitting diode (LED) module coupled in series between an output of the CLD module and the full wave rectifier, the LED module comprising a plurality of LEDs;

a connector for connecting the illumination device to the AC supply;

a housing coupled to the connector; and a substrate coupled to the connector within the housing, the plurality of LEDs mounted on the substrate;

wherein each illumination device comprises at least two connectors to electrically couple one of the illumination devices to at least one other illumination device.

Suitably, each of the at least two connectors is in the form of female socket for receiving a male connector of a cable.

Suitably, one of the connectors of a first illumination device is in the form of female socket for receiving a male plug of another illumination device and another of the connectors of the first illumination device is in the form of male plug for insertion in a female socket of another illumination device.

According to another aspect, although not necessarily the broadest aspect, embodiments of the present invention reside in a method of powering an illumination device including:

converting an alternating current (AC) supply into a direct current (DC) with a full wave rectifier; and passing the DC into:
a current limiting diode (CLD) module coupled in series to an output of the full wave rectifier, the CLD module comprising at least two CLDs coupled in parallel; and
a light emitting diode (LED) module coupled in series between an output of the CLD module and the full wave rectifier, the LED module comprising a plurality of LEDs.

Suitably, the method includes controlling illumination provided by the LED module with at least one switch in series with at least one of the CLDs in the CLD module.

Preferably, the method includes selecting a number of LEDs in the LED module and a number of CLDs in the CLD module to provide a pulsed forward current having pulses comprising flat peaks for at least 10% of the duration of the power cycle.

Further features and aspects of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIG. 1 is a current waveform in a Light Emitting Diode (LED) connected to a known full wave rectification circuit;

FIG. 2 is a normalized luminous intensity waveform for an LED connected to a known full wave rectification circuit;

FIG. 3 is a circuit diagram illustrating a known full wave rectification circuit comprising a filter;

FIG. 4 is a circuit diagram illustrating an illumination device in accordance with embodiments of the present invention;

Figure 5:
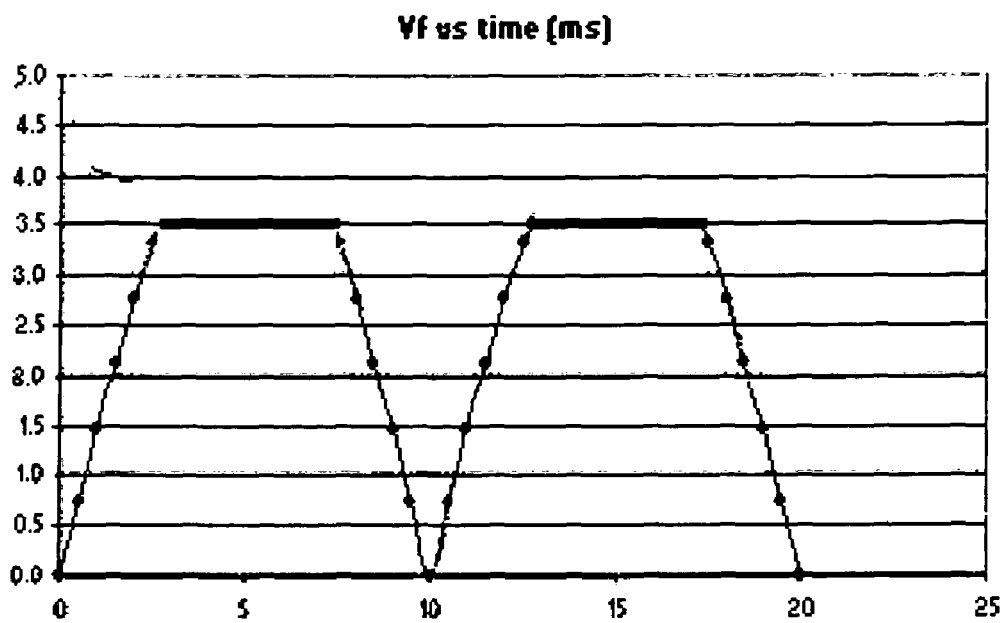
FIG. 5 is a voltage waveform for a LED in an LED module of the device shown in FIG. 4.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Referring to FIG. 4, an illumination device 10 provided in accordance with embodiments of the present invention comprises a rectifier 12 coupled to an alternating current (AC) supply 14 for converting the AC supply 14 into a direct current (DC). A current limiting diode (CLD) module 16 is coupled in series to an output of the rectifier 12 and a light emitting diode (LED) module 18 is coupled in series between an output of the CLD module 16 and the rectifier 12.

The LED module 18 can comprise one or more LEDs in series and/or two or more LEDs in parallel. According to some embodiments, the LED module 18 can comprise one or more LED blocks, with each LED block comprising two or more LEDs in parallel and/or in series. The CLD module 16 can comprise a single CLD or two or more CLDs in parallel. The arrangements of the LEDs and the CLDs will be described in further detail hereinafter. It will be appreciated by the skilled addressee that the term "LED module" includes a single LED and that the term "CLD module" includes a single CLD.

In preferred embodiments, a plurality of LEDs is provided in the LED module 18 for the illumination device 10 to work efficiently. For example, with an AC supply 14 of 120V, the LED module 18 comprises at least 30 LEDs in series. In another preferred embodiment, with an AC supply 14 of 240V, the LED module 18 comprises at least 70 LEDs in series. In such preferred embodiments, the CLD module comprises two or more CLDs in parallel to ensure sufficient illumination is provided by the LED module 18.

The rectifier 12 is a full wave rectifier circuit used to convert the AC supply 14 into a full-wave rectified DC supply. Hence, a full wave rectified direct current flows through the CLD module 16 and the LED module 18. In some embodiments, the rectifier 12 comprises a single component in the form of a single discrete component bridge rectifier. In other embodiments, the rectifier 12 is implemented using four discrete rectifier diodes 20 arranged in a bridge configuration, as shown in FIG. 4.

In embodiments of the present invention, a conventional full-wave rectifier circuit is modified such that the sinusoidal waveform for the voltage and current through the one or more LEDs in the LED module 18 is truncated near the peak of the waveform, as shown in FIG. 5. The truncation reduces the maximum voltage seen by the LEDs and at the same time increases the duration for which the LEDs are operated under the maximum current drive.

Figure 6:
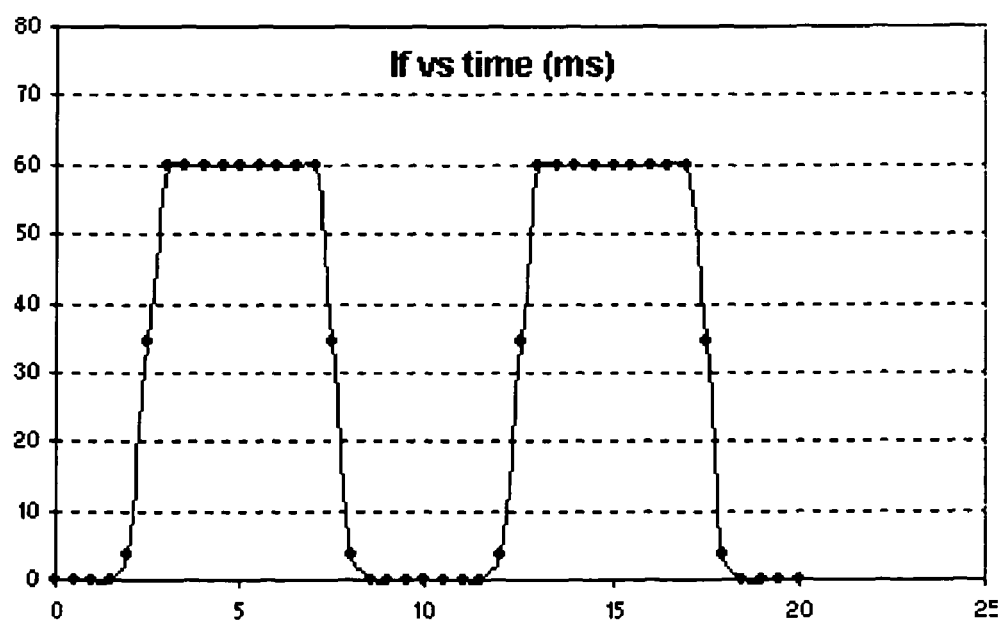
FIG. 6 is a current waveform for an LED in the LED module of the device shown in FIG. 4.

With reference to FIGS. 5 and 6, the effect of introducing the CLD module 16 in the bridge rectifier circuit is to limit the current to a specified current limit using a predetermined number of CLDs. In the example in FIGS. 5 and 6, the current is limited to 60 mA and as a result, the voltage drop across the LEDs is correspondingly limited to about 3.5V. This example uses InGaN LED characteristics for a fair comparison with the waveforms shown in FIGS. 1 and 2. With reference to the luminous intensity waveform in FIG. 7, the modified waveform has the effect of increasing the time-averaged light output for the same amount of power consumed over the conventional full wave rectifier circuit without modification, in accordance with embodiments of the present invention.

In preferred embodiments of the present invention, the voltage drop across each CLD exceeds the CLD limiting voltage $V_L$. The limiting voltage $V_L$ of a CLD is measured at the limiting current $I_L$. The limiting current $I_L$ is 80% of the pinch-off current $I_P$. The pinch-off current $I_P$ is the regulator current at a specified test voltage $V_T$, which is typically 25V. The aforementioned parameters of CLDs will be familiar to the skilled addressee. However, further information can be found, for example, in Motorola datasheet for Motorola CLDs 1N5283 through 1N5314 and datasheets for CLDs produced by other manufacturers.

In the present invention, the number of LEDs present in the LED module 18 in series with one or more CLDs in the CLD module 16 is matched such that the total voltage drop across the LEDs and CLDs is at least 90% of the average voltage of the AC power supply 14. In some embodiments, the total voltage drop across the LEDs and CLDs is substantially the same as the power supply average voltage. In addition, the number of LEDs used in the LED module 18 is determined such that the voltage drop over the CLDs is large enough for the CLDs to operate under a current limiting mode. Typically, the current limiting mode operates above 10V. The forward current ($I_F$)-forward voltage ($V_F$) characteristics of an existing range of CLDs manufactured by Central Semiconductor Corp. are disclosed in their datasheet entitled High Current Current Limiting Diode CCLH080 thru CCLH150, JEDEC DO-35 case.

To illustrate the point, in one embodiment of the illumination device 10 comprising the rectifier 12, CLD module 16 and LED module 18 coupled to the AC supply 14, the voltage drop across the rectifier 12 is typically less than 0.8V per diode 20 or 1.6V total in one direction. At a peak voltage of 340V from the AC supply 14, the voltage drop across the CLD module 16 and the LED module 18 will thus only be 340V−1.6V=338.4V. This represents 99.5% of the supply voltage.

Figure 9:
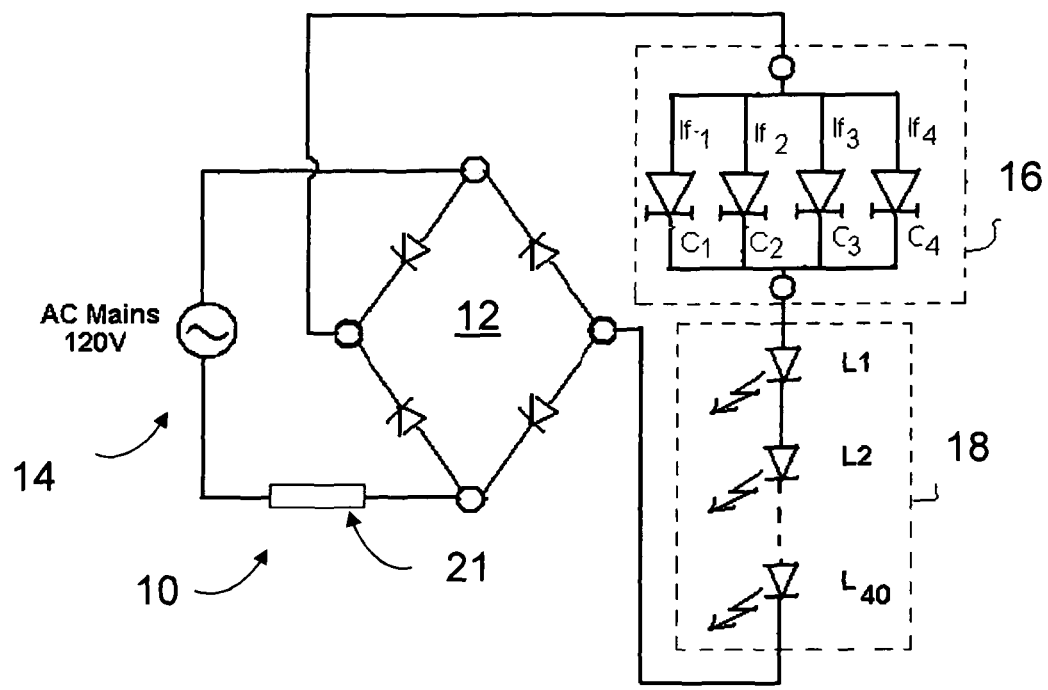
FIG. 9 is a circuit diagram illustrating an illumination device in accordance with a first specific embodiment of the present invention.

As shown in FIG. 9, according to some embodiments, the illumination device 10 comprises a positive temperature coefficient (PTC) resettable fuse 21 coupled in series between the AC supply 14 and an input of the full wave rectifier 12. The resettable fuse 21 introduces less than 0.5V to the circuit at peak voltage. The resultant voltage drop across the CLD module 16 and the LED module 18 is thus only 338.4V−0.5V=337.9V. This represents 99.4% of the supply voltage. The resettable fuse 21 works by increasing its resistance disproportionately after a certain threshold current so the total current is significantly reduced and reverts back to normal when the fuse 21 cools down. Suitable resettable fuses 21 are available from Bourns, although fuses from other manufacturers are also suitable.

Figure 8:
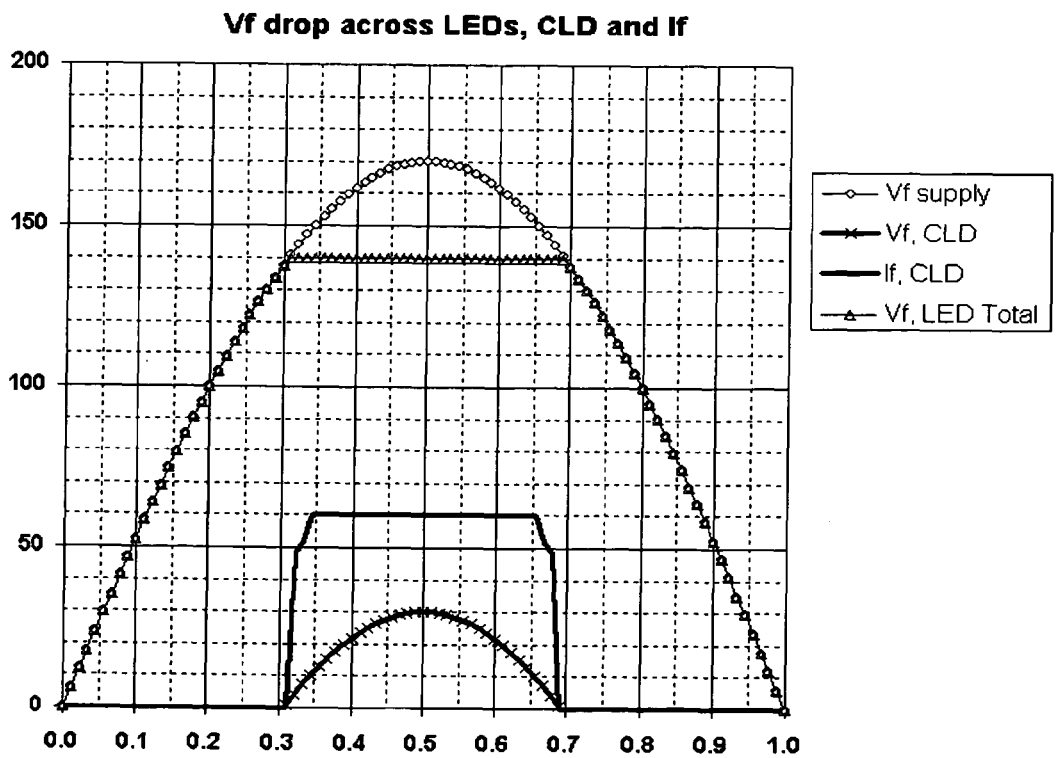
FIG. 8 shows the voltage drop across LEDs and Current Limiting Diodes (CLDs) and the forward current through the CLDs with a rectified AC mains supply for a specific embodiment of the device shown in FIG. 4.

The number of LEDs in the LED module 18 is determined from the variation in the forward voltage of the LEDs at peak current. With reference to FIG. 8, which shows the voltage drop across LEDs and CLDs for a rectified 120V AC mains supply with a rectified peak voltage of 170V, various operational conditions and effects for the LEDs and CLDs for embodiments of the present invention will now be described.

According to one embodiment, the LED module 18 comprises a plurality of InGaN LEDs in series with a typical forward voltage $V_F$ of 3.3V per LED at 20 mA DC. This corresponds to a peak voltage of about 3.6V per LED at 60 mA forward current. With the CLD-based circuit designed to operate under current limiting mode at approximately ⅓ of the power cycle, it is necessary that the CLD module 16 starts limiting the forward current when the varying DC voltage reaches about 140V. This will provide a duration of about 33% of a cycle at a constant limited current mode. With a determined number of forty LEDs, the LED string provides a total voltage drop of 144V at the peak of the power cycle. The CLD module 16 takes up to 26V at peak voltage.

Considering an upper extreme voltage variation with an average forward voltage $V_F$ of 3.60V per LED, the peak forward voltage $V_F$ is 3.90V. Total peak forward voltage $V_F$ for forty LEDs amounts to 156 V and the forward voltage of the CLD module 16 takes up 14V. This enables the CLD module 16 to maintain its current limiting function above minimum operating voltage, which is typically 8 to 10V.

Consider a lower extreme voltage variation with a peak forward voltage $V_F$ of 3.30V, which is less likely than the forward voltage of the LED dropping below its typical value. The LEDs proposed for the present invention belong to a highly efficiently manufactured batch of LEDs. With a peak forward voltage of 3.30V and forty LEDs in the LED module 18, the total forward voltage for the LED module is 132V and the CLD module 16 now takes up 38V. This is still below the CLD peak operating voltage specification, which is typically specified at 50V. The excess voltage drop taken up by the CLD module 16 is dissipated as heat.

With a 240V AC supply, the peak voltage is 340V. Using 88 LEDs in the LED module 18 and operating at a peak forward voltage of 3.60V per LED and 60 mA peak current, the typical total peak forward voltage of the LED module 18 is 317V, leaving a 23V drop across the CLD module 16.

At a higher extreme in which the peak forward voltage is at a 3.75V maximum per LED, this amounts to a total peak forward voltage of the LED module 18 of 330V, leaving a forward voltage drop of 10V across the CLD module 16. Here the specification for forward voltage across individual LEDs needs to be capped at a maximum of 3.75V for an illumination device 10 in the form of a 240V LED lamp, compared with a forward voltage maximum of 3.90V for a 120V LED lamp.

Where a plurality of CLDs are used in the CLD module 16, the CLDs are connected in parallel to each other and the number of CLDs in the CLD module 16 is determined by the forward current required through the LED module 18. According to the current state of the art, each CLD is capable of limiting the current to a maximum of about 15 mA. For a small 10×10 mm LED InGaN chip, the average DC current typically required is about 20 mA. In pulsed mode with a duty factor of 2 or 3, the amount of current allowable is up to about 40-60 mA. As such, the number of CLDs needed would be 60 mA/15 mA=4, or 40 mA/115 mA=3, rounded to the nearest integer. For a larger chip size, the current requirement would be higher. For example, a 20×20 mm chip would require about 120 mA of drive current, i.e. about 8 CLDs with 15 mA limiting capability each.

Further embodiments of the present invention will now be described with reference to FIGS. 9-19.

FIG. 9 shows an embodiment of the illumination device 10 wherein the AC supply 14 supplies 120V mains AC, which is full-wave rectified into DC by rectifier 12. The CLD module 16 comprises four CLDs ($C_1$, $C_2$, $C_3$, $C_4$) connected in parallel and the LED module 18 coupled in series with the CLD module 16 comprises forty LEDs ($L_1$ to $L_{40}$). This embodiment uses InGaN LEDs with a small LED chip size of approximately 100 mm square area) with a typical peak operating voltage of 3.6V at 60 mA in pulsed mode, duty factor ⅓. Each CLD is capable of delivering a forward current $I_F$ of 15 mA in current limiting mode and therefore four CLDs in parallel are needed to provide a 60 mA peak current for the circuit. In this embodiment, the CLDs are CCLH150 high current CLDs by Central Semiconductor Corp. and the rectifier 12 is a single component semiconductor MB6S by Fairchild, however alternative components can be used.

Figure 7:
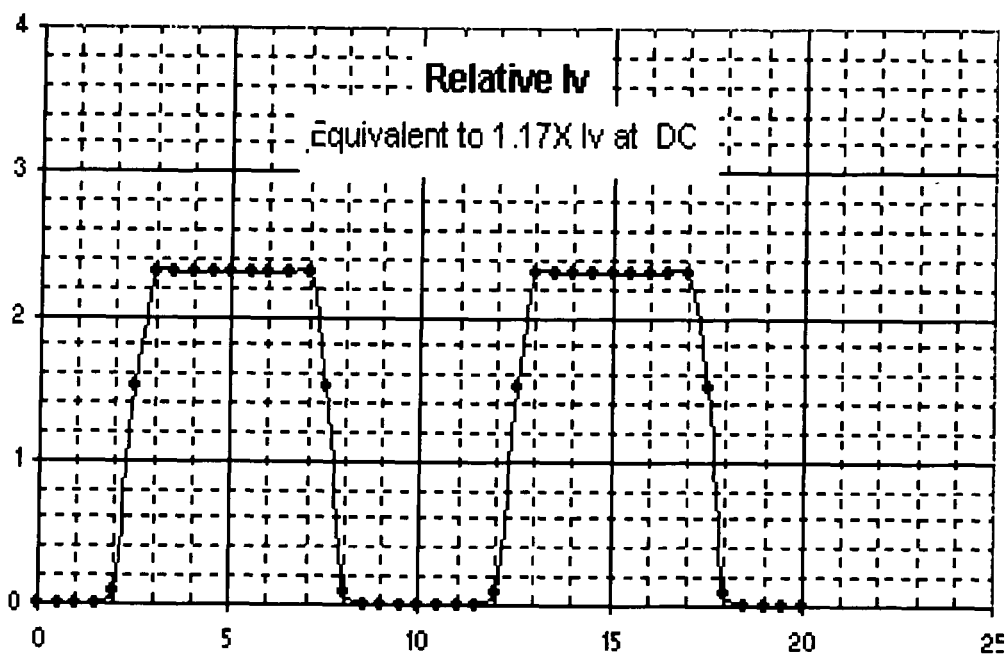
FIG. 7 is a luminous intensity waveform for an LED in the LED module of the device shown in FIG. 4.

In embodiments of this invention, the number of LEDs is determined such that the forward voltage across the LEDs and the forward voltage across the CLDs are balanced in a way that provides a pulsed forward current with a flat peak across the CLD module 16 and the LED module 18 over the power cycle, the flat peak of the forward current being of sufficient duration to provide a time-averaged luminous intensity response close to its DC operated mode, as shown in FIG. 7. With a peak voltage of 170V, the number of LEDs is about forty. This provides a forward voltage drop across the LED module 16 at peak voltage of about 144V for 3.6V-60 mA LEDs. The forward voltage drop across the CLD module 16 is 26V as a result, lower than the maximum allowable peak voltage of 50V for the CLD module 16.

The range in acceptable forward voltage for the LEDs for this circuit is from 3.6V to 3.9V peak voltage at 60 mA. At the limit of 3.9V peak voltage, the total voltage drop across the LED module 18 is 156V, leaving a voltage drop of 14V across the CLD module 16. This is more than the minimum 10V sufficient for a high current CLD to operate under the current limiting mode.

The duration for which the LED is operated at peak current is important because it contributes to the average light output. It is preferable that during operation the flat peak current is as broad as possible, i.e. having a maximum duration over one power cycle. According to embodiments of the present invention, a compromise is achieved when typically the peak current is reached for about 33% of the power cycle. As the ratio of the duration of peak current to the duration of one power cycle drops, the illumination device 10 becomes less efficient. It is anticipated that when the ratio drops below about 10%, the illumination device 10 becomes unacceptably inefficient in terms of the power consumption needed to provide the light output. Hence, the number of LEDs in the LED module 18 and a number of CLDs in the CLD module 16 are selected to provide a pulsed forward current having pulses comprising flat peaks for at least 10% of the duration of the power cycle.

There is a minimum number of LEDs required in embodiments of the invention in order for the illumination device 12 to operate at or near optimal efficiency. In a limiting case, a peak average forward voltage across LEDs is at a limit of 4.0V, with an AC supply 14 of 110V and a peak voltage of 155V. The voltage drop across the CLD module 16 is at a limit of 35V. There is a remaining voltage drop of 120V across a series of 4.0V LEDs in the LED module 18, thus fixing the minimum number of LEDs at thirty in this embodiment.

It is to be appreciated that as the AC supply 14 is increased, e.g. to 120V AC, 220V AC or 240V AC, the number of LEDs in the LED module 18 in series with the CLD module 16 is increased from the minimum of thirty in the above example. It is also to be appreciated that as the average peak forward voltage of the LEDs at maximum operating current is reduced from 4.0V, the number of LEDs in the LED module 18 in series used in the embodiments of the invention also needs to be increased from the minimum of thirty LEDs in the above example in order for the illumination device 12 to operate optimally in terms of light output and efficiency.

It is also to be appreciated that as the type of LEDs changes, the peak voltage at maximum current will also change. For example, replacing the InGaN LEDs (typically for blue and green illumination) with other types of LEDs, such as AlInGaP LEDs (typically for orange and red illumination), the peak voltage at maximum current will drop from close to 4.0V to close to 3.0V, thereby increasing the number of LEDs used in the LED module 18.

The aforementioned minimum number of thirty LEDs specified for the above embodiments for optimal efficiency is based on existing types of LEDs, such as InGaN and AlInGaP LEDs. However, the inventor envisages that as other materials are developed for use in LEDs, the minimum number of LEDs that can be used in the illumination device 10 of the present invention will decrease.

Figure 10:
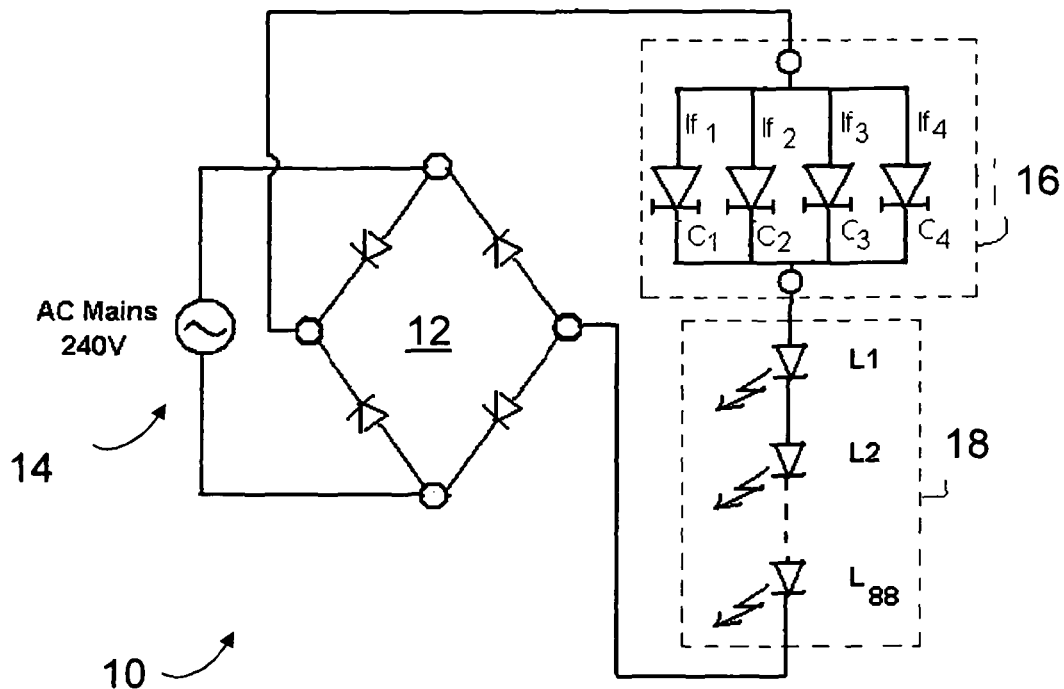
FIG. 10 is a circuit diagram illustrating an illumination device in accordance with a second specific embodiment of the present invention.

FIG. 10 shows an embodiment of the illumination device 10 wherein the AC supply 14 supplies 240V mains AC, which is full-wave rectified into DC by rectifier 12. For a 240V AC supply, the peak voltage experienced is about 340V and the number of LEDs needs to be adjusted to ensure that the voltage drop across the CLD module 16 will enable a current pulse of sufficient duration in a power cycle. The CLD module 16 comprises four CLDs ($C_1$, $C_2$, $C_3$, $C_4$) connected in parallel and the LED module 18 coupled in series with the CLD module 16 comprises eighty-eight LEDs ($L_1$ to $L_{88}$).

The LEDs in this embodiment are InGaN LEDs with a typical forward voltage of 3.3V at 20 mA DC. The typical peak voltage at 60 mA for such LEDs is about 3.6V. At 3.6V peak voltage, the total voltage across the LED block for eighty-eight LEDs in series is 317V. The peak voltage drop across the CLD is therefore 23V, which is still within the maximum allowable peak voltage of 50V for the CLD. At 3.75V peak voltage per LED, the total voltage across the LED block is 330V. The peak voltage drop across the CLD is therefore 10V, which is just at the minimum voltage needed to operate in current limiting mode. In this embodiment, the CLDs are CCLH150 high current CLDs by Central Semiconductor Corp. and the rectifier 12 is a single component semiconductor MB6S by Fairchild, however alternative components can be used.

The difference between this embodiment with a 240V supply and the previous embodiment shown in FIG. 9 with a 120V supply is that the LED forward voltage characteristics need to have a limit $V_{FMAX}$ of 3.75V at the peak current of 60 mA versus a limit $V_{FMAX}$ of 3.90V at 60 mA for the 120V LED lamp.

Figure 11:
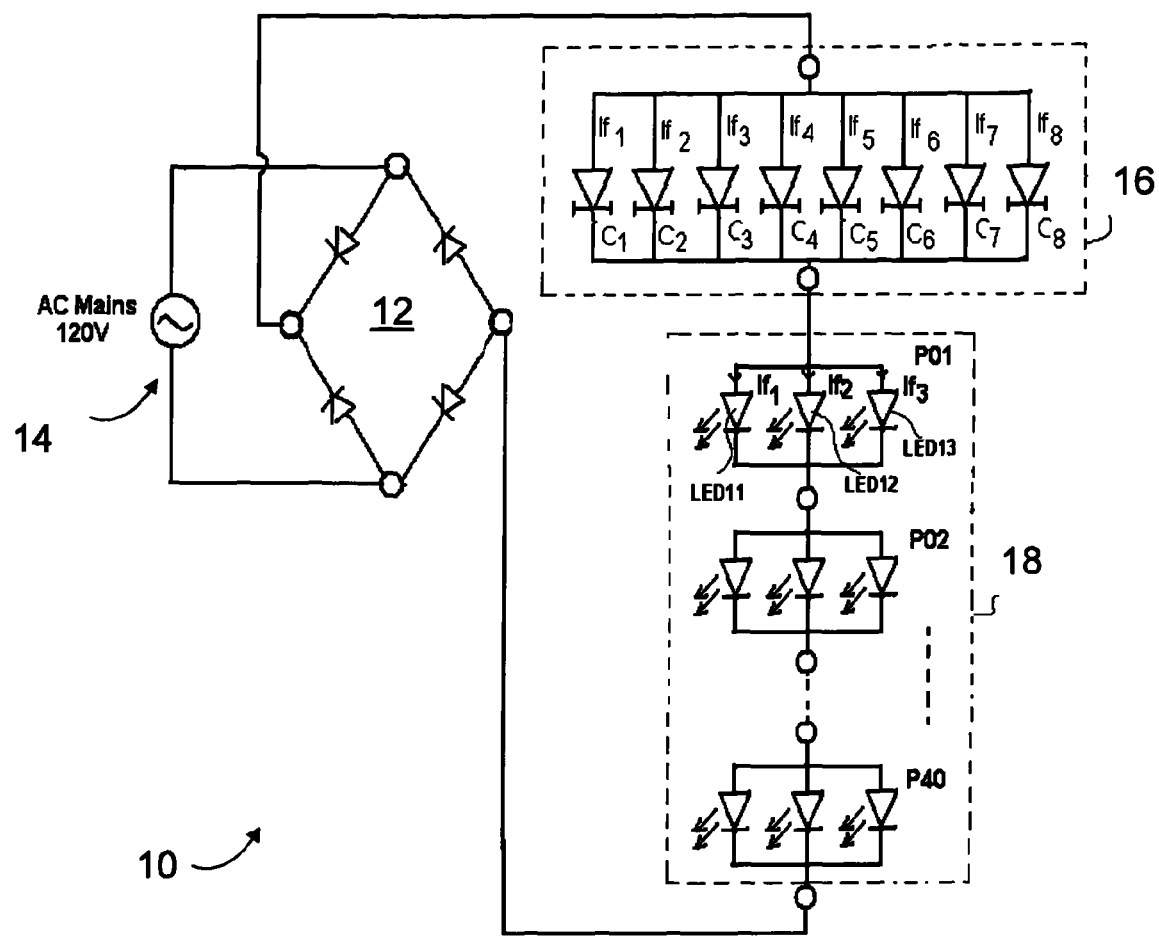
FIG. 11 is a circuit diagram illustrating an illumination device in accordance with a third specific embodiment of the present invention.
Figure 12:
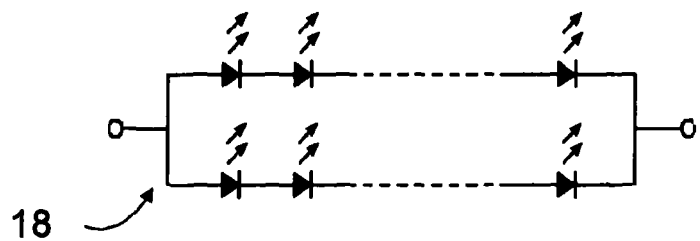
FIGS. 12-17 show different arrangements of LEDs in the LED module.

FIG. 11 illustrates a third embodiment of the illumination device 10 of the present invention wherein the AC supply 14 supplies 120V mains AC, which is full-wave rectified into DC by rectifier 12. In this embodiment, the CLD module 16 comprises eight CLDs ($C_1$, $C_2$, ..., $C_8$) connected in parallel and the LED module 18 comprises a plurality of LED blocks (P01, P02, ..., P40) connected in series. Each LED block comprises three LEDs (LED11, LED12, LED13 etc.) in parallel and in this embodiment forty LED blocks are connected in series. The total voltage drop across the LED module 18 is similar to the total voltage drop across forty LEDs in series, as described above in relation to FIG. 9.

There are two important advantages associated with the configuration shown in FIG. 11. One advantage is that the LED module 16 still operates when there is a failure of one or more of the LEDs. If one LED in a series of individual LEDs fails, it causes the whole series of LEDs to fail. With a long series of LEDs, the reliability of the illumination device 10 decreases exponentially as the number of LEDs in the series increases.

In this embodiment, the eight parallel CLDs ($C_1$, $C_2$, ..., $C_8$) in the CLD module 16 provide a total peak current limit of 120 mA under the current limiting mode of operation. This total peak current is shared among the three parallel LEDs (LED11, LED12, LED13 etc.) in an LED block, each LED receiving about 40 mA. When a single LED fails in open circuit, the LED module 18 can still operate at near maximum capacity. With reference to FIG. 11, when LED11 fails, the forward current $I_{F1}$ is diverted to LED 12 and LED 13. When LED11 fails, the peak forward current $I_{F1}$ of 40 mA is diverted and shared between $I_{F2}$ and $I_{F3}$ across LED12 and LED13. Thus, the peak forward current $I_{F2}$ and $I_{F3}$ are increased from 40 mA to 60 mA for LED12 and LED13.

Another advantage of the configuration shown in FIG. 11 is that the LED light output is not significantly affected by the failure of one LED in the LED module 18. Overall operation of the LED module 18 is minimally affected since only one out of 120 LEDs fails to emit light. Equally importantly, if one LED in one of the LED blocks (P01, P02, ..., P40) fails, the increased forward current in the remaining two LEDs of the LED block actual boosts the light output by an amount almost equal to the light loss caused by the failure of the LED. This is the result of the characteristics of LEDs for which the light output is roughly proportional to the forward current flowing through the LED. Thus, the light loss caused by the failed LED is compensated for by the increased light output of the other two LEDs in the LED block, thus achieving near parity with the original light output before LED failure.

Various arrangements of the LEDs in the LED module 18 will now be discussed with reference to FIGS. 12-17. As an alternative to the single string of LEDs in series shown in FIGS. 9 and 10, the LED module 18 can comprise multiple strings of LEDs in parallel, such as the two parallel series of LEDs shown in FIG. 12. This embodiment enables the LED module 18 to function even though one series encounters a failure. The trade-off however is that in the event of failure in one series of LEDs, the remaining series will experience twice the amount of current and this over-current will reduce the lifetime of the remaining LEDs.

Figure 13:
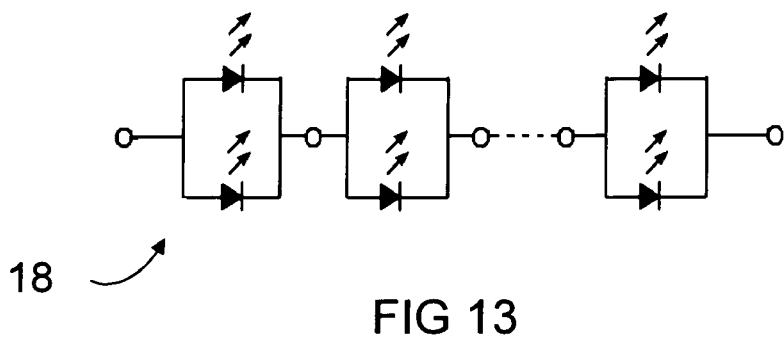

With reference to FIG. 13, the LED module 18 can comprise a plurality of LED blocks, each block comprising a pair of LEDs in parallel. This arrangement allows for the LED module 18 to function even though one of the LEDs encounters a failure. The arrangement in FIG. 13 has the advantage over the arrangement in FIG. 12 that only one LED experiences an increase in current due to failure in its counterpart, whereas the rest of the pairs of LEDs in each LED block are unaffected.

Figure 14:
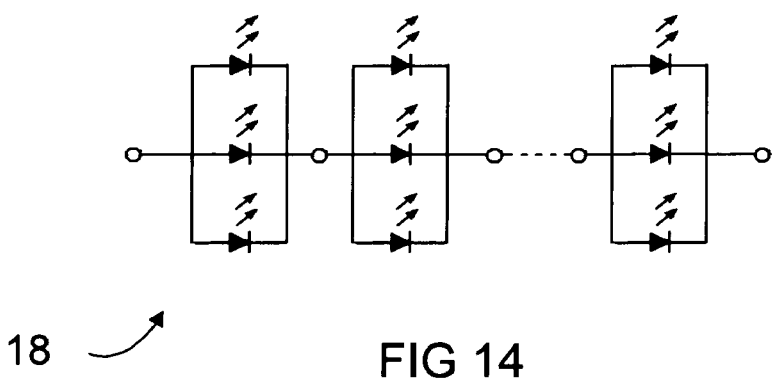

With reference to FIG. 14, the LED module 18 can comprise a plurality of LED blocks, each LED block comprising three LEDs in parallel. This arrangement is an improvement over the embodiment in FIG. 13 in that when one of the LEDs in one of the LED blocks connected in series fails, the forward current in the other two LEDs in the LED block experience a 50% increase in forward current compared to a 100% increase in forward current for LED blocks comprising a pair of LEDs in parallel. This lower increase in forward current lowers the electrical stress experienced by the LEDs affected by the failure.

Figure 15:
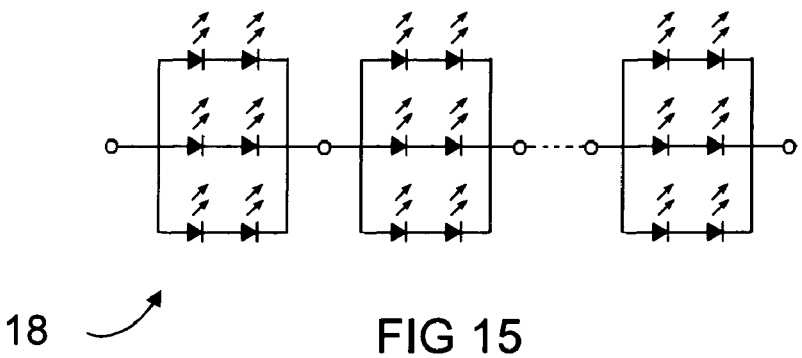

With reference to FIG. 15 and in contrast to FIG. 14, the LED module 18 can comprise a plurality of LED blocks, each LED block comprising three parallel series of LEDs. In this embodiment, each parallel series comprises two LEDs in series. This arrangement reduces the impact of current hogging caused by single LEDs in parallel. In the situation of current hogging, more current flows through an LED having a lower forward voltage compared to its higher forward voltage neighbours in a parallel string. This causes uneven light emission and uneven heat dissipation between LEDs, which is undesirable.

When there are two LEDs in series, the variation in single LEDs is less since only the sum total of the forward voltage across the pair of LED counts. The variation in sums of the forward voltages of two LEDs is generally more favourable compared to the variation between each LED. The trade-off with this arrangement is that when there is failure in one LED of the LED pair in series, it results in light loss from both LEDs in the series.

Figure 16:
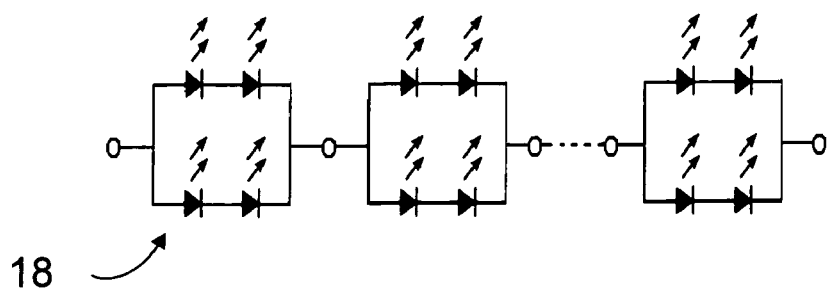

With reference to FIG. 16, the LED module 18 can comprise a plurality of LED blocks, each LED block comprising two parallel series of LEDs. In this embodiment, each parallel series comprises two LEDs in series. This arrangement has an advantage over embodiment in FIG. 13 in terms of current hogging, with the trade-off of more light loss if one of the LED were to fail.

Figure 17:
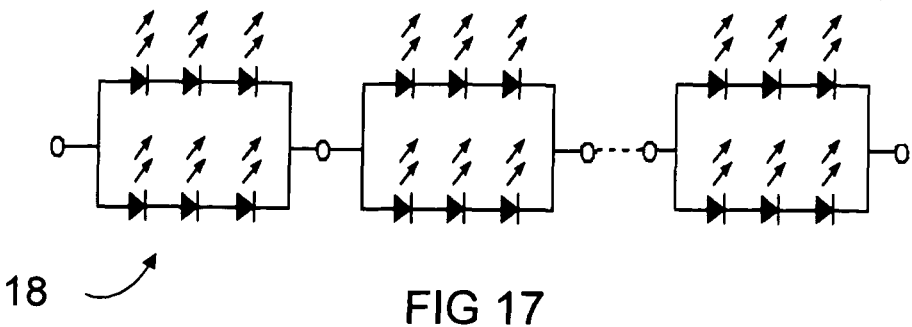

With reference to FIG. 17, each LED block in series in the LED module 18 comprises two parallel series of LEDs with three LEDs in each parallel series. This arrangement has an advantage over the embodiments in FIGS. 13 and 16 in terms of current hogging, because the total forward voltage is now a sum of three LEDs. The percentage variation in total forward voltage in a string would be less than the percentage variation in forward voltage across two LEDs, or across one LED.

For example, consider six LEDs with forward voltages of 3.1, 3.2, 3.2, 3.3, 3.4 and 3.5V distributed in two configurations. In one, three LEDs are in parallel, e.g. 3.2, 3.3, 3.5V in one group and 3.1, 3.2 and 3.4V in another. The forward voltage difference between minimum and maximum is 0.3V for both groups, amounting to about 10% of the average forward voltage (i.e. 3.23 to 3.33V) across one LED. In another arrangement, three LEDs in series with forward voltage of 3.2, 3.3, 3.5V have a total forward voltage of 10.0V, while the other string with forward voltages of 3.1, 3.2, and 3.4V have a total forward voltage of 9.7V. The forward voltage difference between the two strings of LEDs is 0.3V, which mounts to only about 3% of the LED string total forward voltage of 9.7~10.0V.

The design of the CLD module 16 is largely dependent on the target total peak forward current required and the current limiting capacity specification of the CLDs used. High current CLDs CCLH080 thru CCLH150 with a JEDEC DO-35 double plug case manufactured by Central Semiconductor Corp. are suitable for use in embodiments of the present invention, although a range of CLDs available from a number of different manufacturers are also suitable. The CLD module 16 can comprise a single CLD or a plurality of CLDs in parallel, as described above in relation to FIGS. 9-11.

Further embodiments of the illumination device 10 of the present invention will now be described in relation to FIGS. 18 and 19. According to some embodiments, the CLD module 16 comprises at least one switch in series with at least one of the CLDs. The switch can be a mechanical switch or an electronic switch. These embodiments include the capability to provide dimming control to the LED module 18 by switching on the required number of CLDs in CLD module 16. The levels of dimming achievable correspond to the number of CLDs switched on as used in the circuit.

Figure 18:
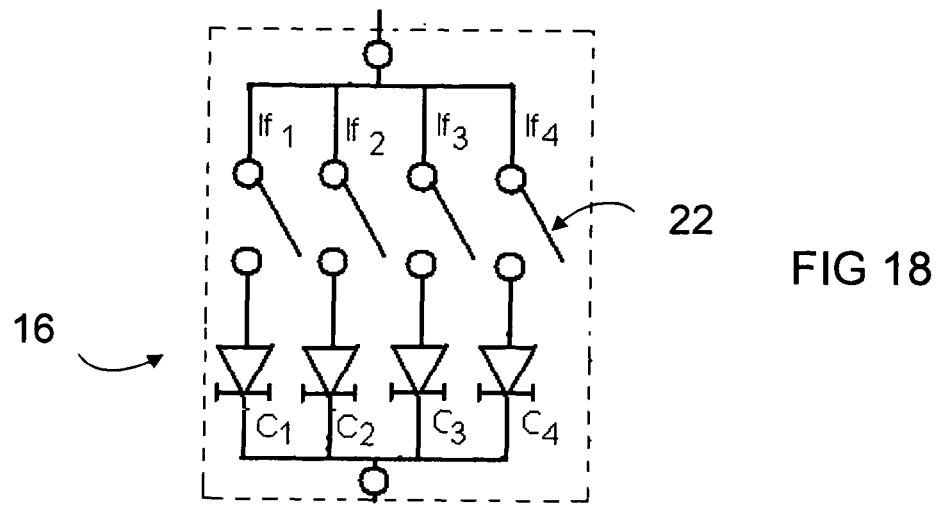
FIG. 18 is a circuit diagram illustrating the CLD module comprising switches for dimming control.

In the embodiment shown in FIG. 18, the CLD module 16 comprises four mechanical switches 22, one switch connected in series to each CLD ($C_1$, $C_2$, $C_3$, $C_4$). It is to be appreciated that the term "mechanical switch" refers to a switch that is activated by a physical contact between two terminals allowing current to flow therethrough.

Figure 19:
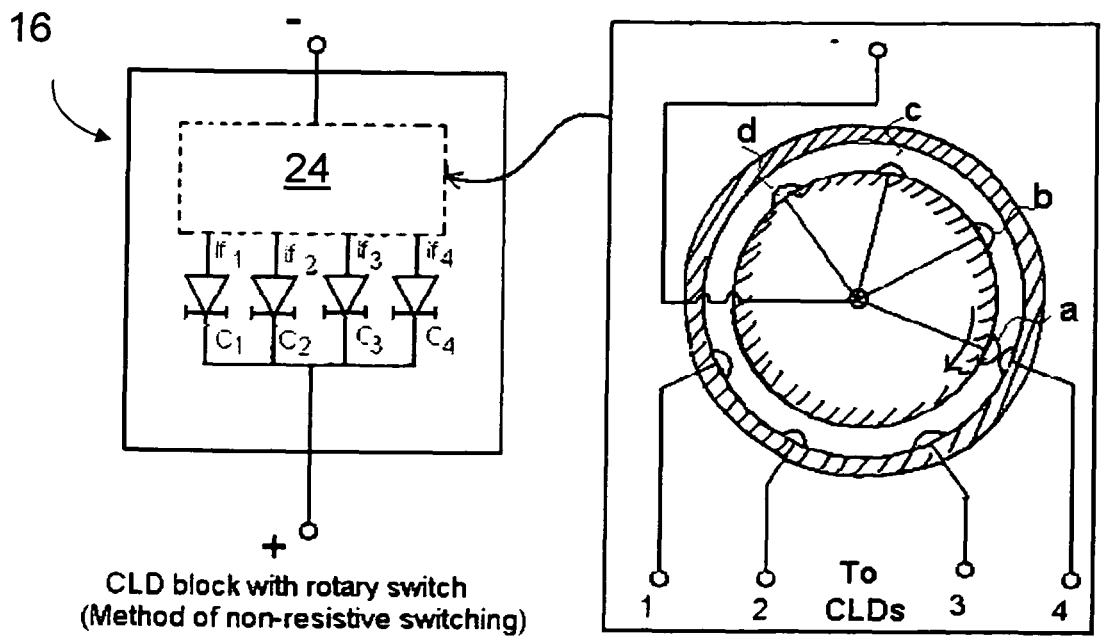
FIG. 19 is a circuit diagram illustrating the CLD module comprising a rotary switch for dimming control.

In the embodiment shown in FIG. 19, the four mechanical switches 22 in the CLD module 16 of the previous embodiment are replaced with a rotary switch 24 with a number of different positions corresponding to each level of lighting required. For example, the rotary switch 24 can comprise a plurality of terminals (1-4) on an inner surface of an outer ring for contacting variously with a plurality of terminals (a-d) on an outer surface of an inner dial, knob or similar. FIG. 19 shows terminal 4 in contact with terminal a. With reference to Table 1 below, the rotary switch 24 can be sequenced through switch positions 1 to 8 to vary the terminals (1-4) and (a-d) that contact each other and thus vary the lighting levels according to the number of CLDs utilized. Switch positions 1 to 8 correspond to the following number of CLDs that are utilized: 0-1-2-3-4-3-2-1. For example, in position 3, terminal a is in contact with terminal 3 and terminal b is in contact with terminal 4 such that two of the CLDs are enabled. The switch can be activated and sequenced by, for example, repeatedly tugging a string connected to the switch, or by other manual switching means.

TABLE 1

| Position | Terminals in Contact | No. of CLDs enabled |
|---|---|---|
| 1 | — | 0 |
| 2 | a4 | 1 |
| 3 | a3, b4 | 2 |
| 4 | a2, b3, c4 | 3 |
| 5 | a1, b2, c3, d4 | 4 |
| 6 | b1, c2, d3 | 3 |
| 7 | c1, d2 | 2 |
| 8 | d1 | 1 |

In other embodiments, the one or more switches 22 are in the form of one or more electronic switches connected to a remote-controlled circuit responding to electromagnetic signals, such as infrared (IR), radio or visible light signals, to set the dimming level. It is to be appreciated that the term "electronic switch" refers to a switch in which an electronic signal is sent to an electronic relay to switch a circuit on or off, thus allowing or blocking respectively current flow between two terminals. The signal used to trigger the electronic switch can be provided by electromagnetic signals from a remote control or from optically encoded dial switches, also known as contactless switches. Where the signal is an IR signal, the infrared data association (IRDA) communication protocol may be employed.

The various advantages of using CLDs in the present invention will now be discussed. In the absence of the CLD module 16 in the circuit, the LEDs would be subject to higher forward voltage peaks. As the forward voltage in an LED rises, the light output tends to saturate and the efficiency tends to drop due to current saturation in the LED junction. The light output with the full sine wave power supply is such that the LEDs are operated in their efficient range only for a short duration, whereas at other times there is either no light output, or the efficiency of light output is diminished due to overly high forward voltage and forward current, particularly near the peak of the sine wave. With the current limited to a predetermined level, the LEDs can thus function more efficiently at a longer duration of the cycle. Furthermore, the electrical stress is lower leading to longer operating life for the LEDs.

Figure 20:
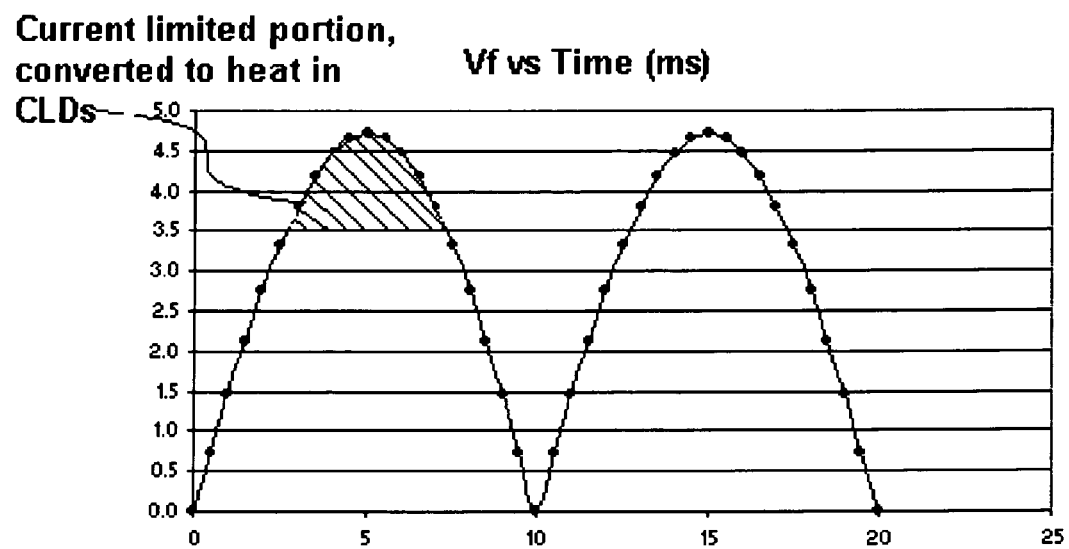
FIG. 20 is a voltage waveform illustrating heat dissipation by the CLD module.

Regarding the prior art problem of higher LED junction temperature caused by high forward voltages, on the high forward voltage cycle of the power supply, the one or more CLDs in the CLD module 16 in embodiments of the present invention take up the excess forward voltage. Thus, with reference to FIG. 20, heat is dissipated in the CLDs instead of in the LEDs, keeping the LEDs cooler and thus increasing the light conversion efficiency of the LEDs. Furthermore, the lifetime of the LEDs are increased as a result of lowered temperature in the LEDs. The position of the CLDs in the circuit board can be designed to be as far away from the LEDs as possible, thus minimizing the ambient temperature around the LEDs.

In embodiments of the present invention, the total cost is lower than that of the conventional circuit rectification using transformers, resistors, inductors and capacitors. In embodiments of the present invention, only two types of solid state device are used for driving the LEDs directly from the AC mains supply 14, i.e. CLDs and rectifying diodes. The number of components required is also much lower than many of the prior art circuit designs, which helps to reduce cost and facilitate smaller designs.

The absence of capacitors in the AC to DC conversion improves the power factor of the CLD rectifier based illumination device of the present invention compared to conventional AC-DC conversion and minimizes total harmonic distortion. Other power supplies for LEDs, CCFLs and fluorescent lamps need costly schemes to achieve an acceptably high power factor and low total harmonic distortion for the power supply.

With the peak current truncated from the sine waveform, the average DC current of the modified waveform using the CLD-based rectified circuit of the present invention is increased compared with a normal bridge rectifier output. This has the effect of increasing the time-averaged light output of the LED system.

Furthermore, because the LED is operated in pulsed mode, the maximum DC current can be taken beyond the maximum allowable DC current in non-pulsed mode. As a matter of good design practice for reliability, the heat generated in pulsed mode should be not be more than that in non-pulsed pure DC mode. For an equivalent amount of DC power dissipated, the maximum pulsed DC current can be as high as three times the maximum allowable average DC current for DC mode.

This higher pulsed DC current is able to compensate for the loss of luminous intensity (lv) during the "off cycle". The resultant time-averaged luminous intensity can be designed to be near to or exceed the average luminous intensity at DC mode. FIG. 7 shows a pulsed DC mode luminous intensity flattening out at 2.3 times the luminous intensity at pure DC mode. The time-averaged luminous intensity over the power cycle is about 1.2 times that of the luminous intensity in pure DC mode.

Regarding the aforementioned problem of the need for LEDs to be narrowly binned in terms of their forward voltage, in the case of the CLD-based rectifier illumination device of the present invention, any variation in the forward voltage of the LEDs in a string is taken up by the CLD module 16, while the current flowing through the LED string is limited at a fairly constant maximum value. This ensures a lower variation in light output between devices.

The CLD-based illumination device of the present invention eliminates the need for inductive components, such as transformers, inductors or magnetic coils. Hence, additional EMI suppression measures are not required and the humming noise created by the magnetic components is avoided.

Further embodiments of the present invention will now be described with reference to FIGS. 21 to 28.

Figure 21:
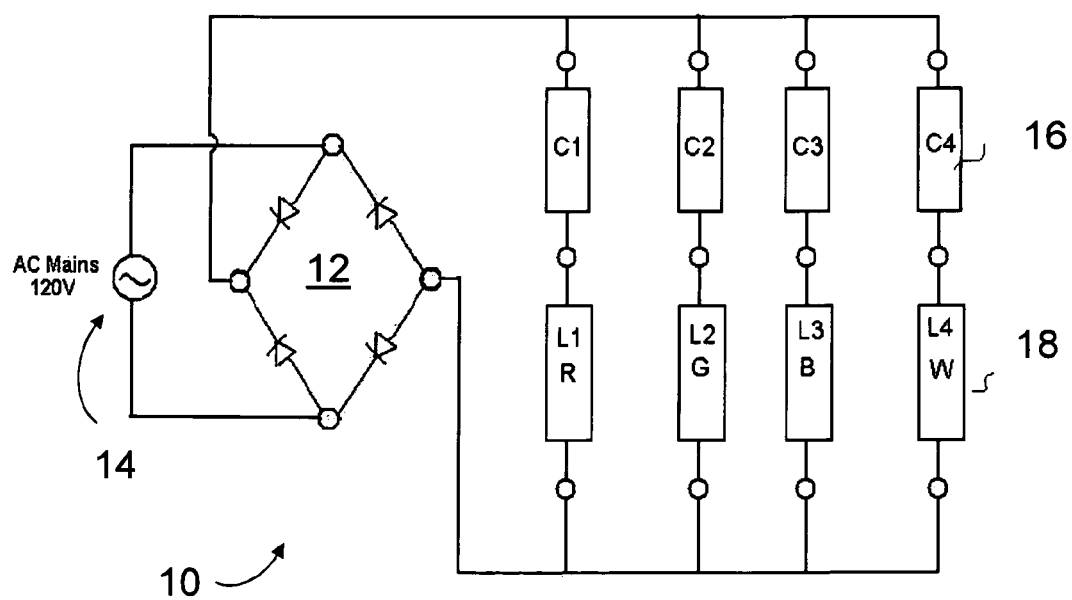
FIG. 21 is a circuit diagram illustrating an illumination device in accordance with a fourth specific embodiment of the present invention.

With reference to FIG. 21, some embodiments of the illumination device 10 comprise at least two LED modules 18 and at least two CLD modules 16, each LED module 18 coupled in series to a respective CLD module 16. In the embodiment shown in FIG. 21, the illumination device 10 comprises four parallel LED modules 18 (L1, L2, L3, L4), each LED module 18 coupled in series respectively to four parallel CLD modules 16 (C1, C2, C3, C4). In this embodiment, each LED module 18 comprises LEDs of a single color. For example, LED module L1 consists of only red (R) LEDs, LED module L2 consists of only green (G) LEDs, LED module L3 consists of only blue (B) LEDs and LED module L4 consists of only white (W) LEDs.

In this embodiment, the LEDs in the LED modules 18 are connected in series, but the arrangement of LEDs in the LED modules can have any configuration of LEDs as described herein with reference to FIGS. 9-17.

In this embodiment, each CLD module 16 comprises a switch to selectively utilize the CLDs coupled in parallel within each CLD module 16 to achieve different lighting levels. For example, the CLD modules 16 (C1, C2, C3, C4) can comprise the non-resistive rotary switch 24 as described above in relation to FIG. 19. This arrangement enables multi-colored illumination with adjustable luminous intensity to be achieved. Each rotary switch 24 achieves four levels of luminous intensity for each color since one, two three or four CLDs in each CLD module 16 can be utilized. Including the OFF position, there are 5 levels of luminous intensity for each color. Therefore, the combination of five different luminous intensity levels and 4 different colors provides $5^4=625$ different color and luminous intensity settings. In general, the number of color/luminous intensity level combinations increases by $(n+1)^m$, where n is the number of CLDs used to drive each LED module 18 and m is the number of differently colored LED modules used. In this embodiment, mixtures of white with red, green or blue LEDs, for example, produce a pleasing palette of pastel colors, e.g. apple green, light pink, bluish white, yellowish white etc.

The embodiments of the invention for powering and controlling colored LEDs using the CLD-based rectifier circuit address the aforementioned problems associated with the prior art colored LED control systems in that they accomplish both the efficiency of pulse width modulation illumination systems and the simplicity of color mixing through the use of multi-level switches. This capability would not be possible unless CLDs are used in conjunction with each LED module in accordance with the present invention.

It will also be apparent to those practicing in the art that an electronic equivalent circuit of performing the multi-level switching can also be implemented. For example, the switching interface can be in the form of push-buttons or optically encoded contactless rotary switches or dials or an intelligent remote IRDA controller in communication with an IR receiver on the CLD modules 16, as described above and further below in relation to the embodiment shown in FIG. 26.

Figure 22:
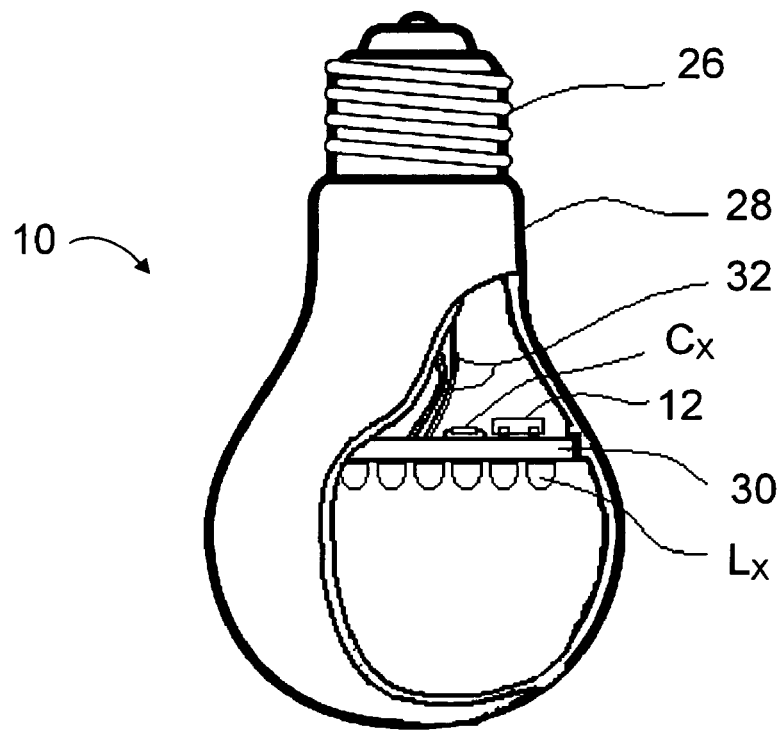
FIG. 22 is a schematic drawing of an embodiment of the illumination device in which the CLDs, LEDs and rectifier are provided within a housing.

Referring to the embodiment in FIG. 22, the illumination device 10 is in the form of a light bulb, light globe or lamp and comprises any of the CLD-based rectifier circuits in accordance with embodiments of the present invention described herein. The illumination device 10 further comprises a connector 26 for connecting the illumination device 10 to the AC supply 14. As shown in FIG. 22, the connector 26 can comprise an external screw thread 28 for screwing into a conventional light socket. Alternatively, the connector 26 can be in the form of a conventional bayonet fitting comprising a pair of protruding pins (not shown). The connector 26 can have any other type of shape such that it can be received in the desired socket or fitting. The illumination device 10 further comprises a housing 28 in the form of a glass bulb coupled to the connector 26. The illumination device 10 further comprises a substrate 30 coupled to the connector 26 via wires 32. In some embodiments, the substrate 30 can be in the form of a printed circuit board (PCB), and may comprise one or more of an aluminum core, a heat sink, anodized copper plate. The substrate 30 is provided within the housing 28 and can be mounted to an inner wall of the housing by any suitable means known in the art. The plurality of LEDs ($L_1$ to $L_X$) from one or more LED modules 18 are mounted on the substrate 30. In this embodiment, the at least two CLDs ($C_1$ to $C_X$) from one or more CLD modules 16 and the full wave rectifier 12 are mounted to the substrate 30.

Figure 23:
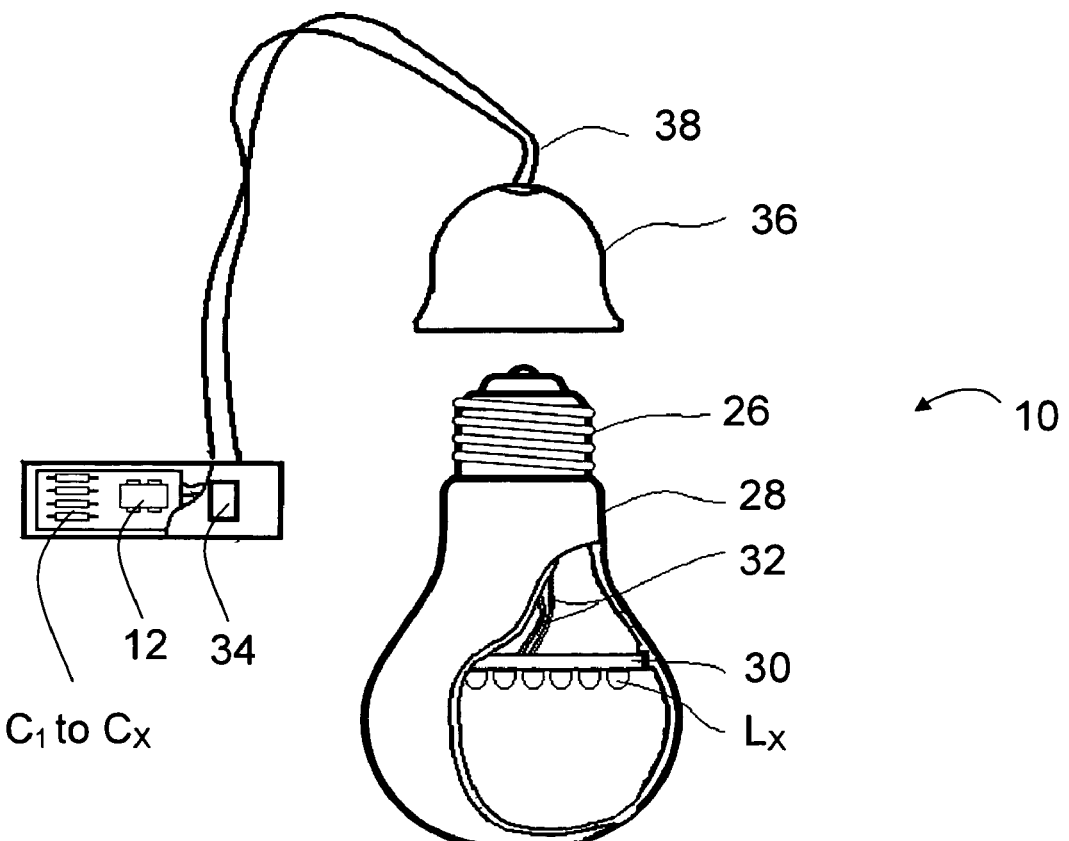
FIG. 23 is a schematic drawing of an embodiment of the illumination device in which the CLDs, and the rectifier are provided external to the housing.

With reference to the embodiment shown in FIG. 23, the illumination device 10 is in the form of a light bulb, light globe or lamp similar to the previous embodiment as described above and shown in FIG. 22. However, in this embodiment, the at least two CLDs ($C_1$ to $C_X$) from one or more CLD modules 16 and the full wave rectifier 12 are not mounted to the substrate 30 in the housing 28 and instead are external to the housing 30. In this embodiment, the at least two CLDs ($C_1$ to $C_X$) and the full wave rectifier 12 are coupled to a main switch 34 in a separate unit coupled to a socket 36 via connecting wires 38. The connector 26 of the illumination device 10 is received within the socket 36 to connect the illumination device 10 to the AC supply 14 via the at least two CLDs ($C_1$ to $C_X$), the full wave rectifier 12 and the main switch 34.

Figure 24:
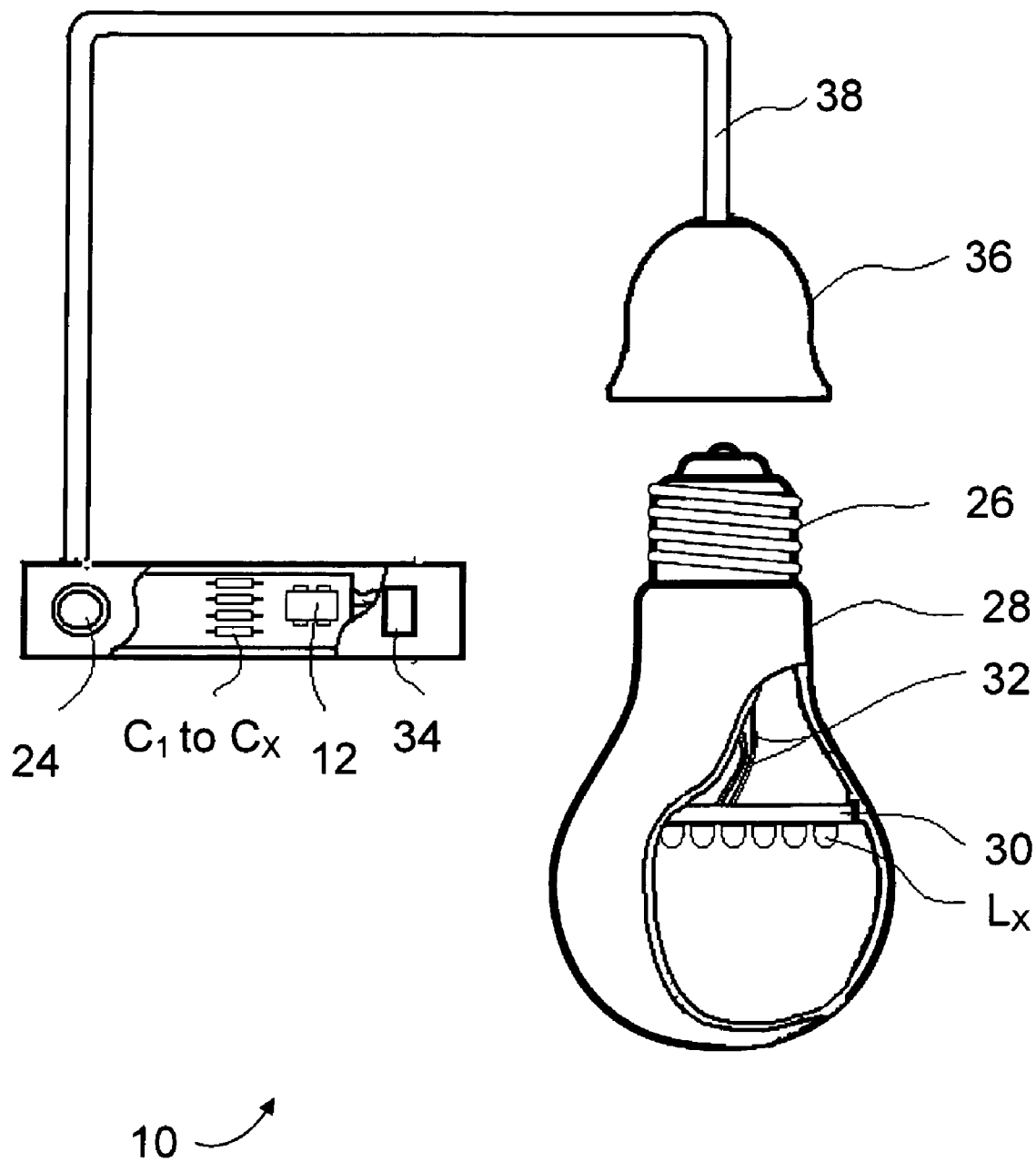
FIG. 24 is a schematic drawing of an embodiment of the illumination device in which the CLDs, the rectifier and a switch are provided external to the housing.

Turning to FIG. 24, a similar arrangement to that described above in relation to FIG. 23 is shown. However, in this embodiment, at least one switch 24 is provided in series with at least one of the CLDs ($C_1$ to $C_X$) in the CLD module 16. Hence, the at least one switch 24 and the CLDs are external to the housing 30 and in this embodiment are provided in a separate unit comprising the rectifier 12 and main switch 34. The at least one switch 24 can be in the form of the rotary switch as described above to provide dimming control wherein the level of dimming is determined by the discrete number of CLDs ($C_1$ to $C_X$) present in the CLD module 16.

Figure 25:
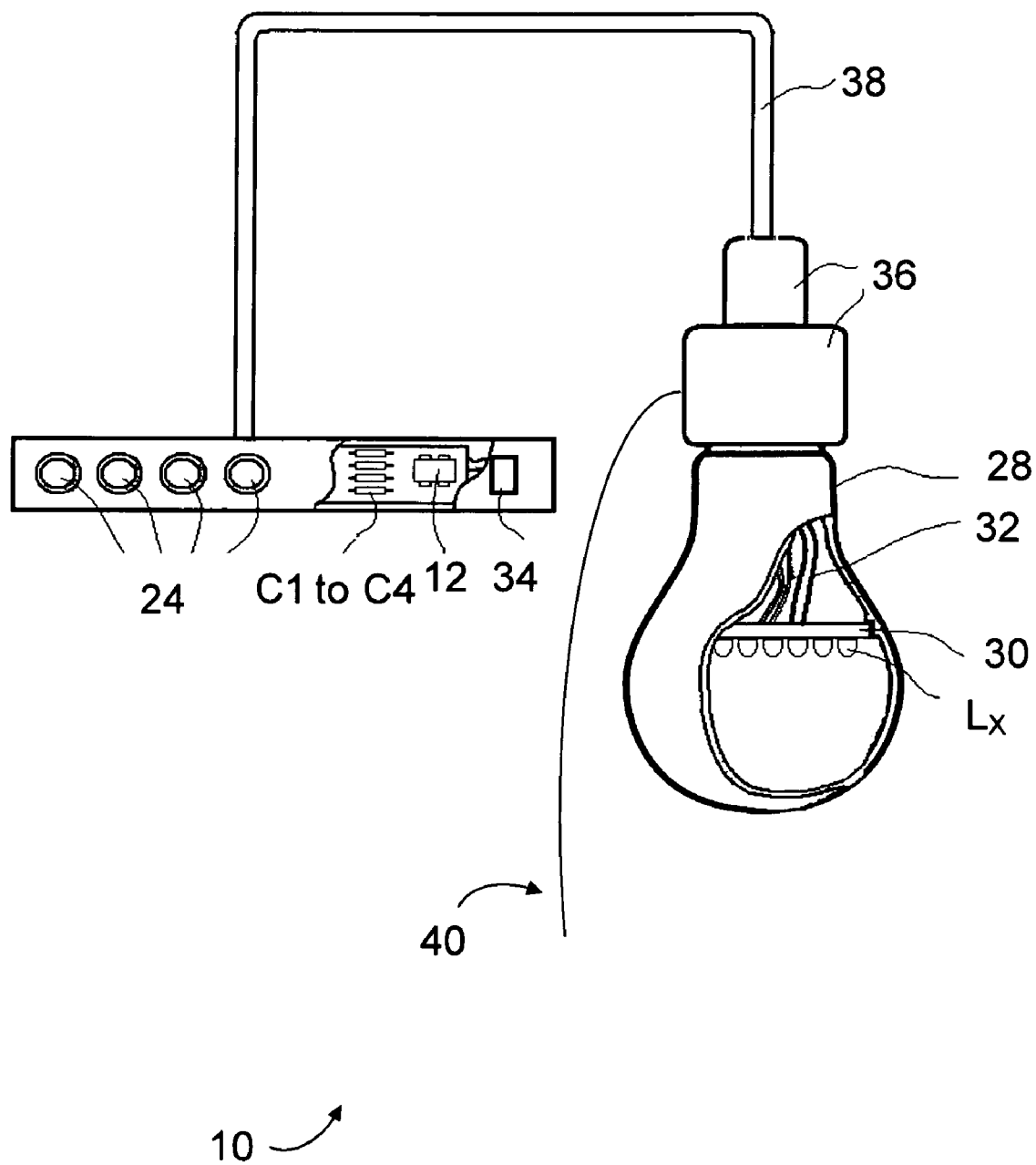
FIG. 25 a schematic drawing of an embodiment of the illumination device comprising LEDs of more than one color and in which the CLDs, rectifier and switches are provided external to the housing.

The illumination device 10 shown in FIG. 25 is similar to the arrangement described above in relation to FIG. 24, except that the illumination device 10 comprises at least two LED modules 18 and at least two CLD modules 16, each LED module 18 coupled in series to a respective CLD module 16 and each LED module comprising LEDs ($L_1$ to $L_X$) of a single color. For example, four LED modules can be provided comprising only white, red, green or blue LEDs ($L_1$ to $L_X$). A switch 24 is coupled in series with each CLD module 16. The switches 24 can be in the form of, for example, rotary switches as described above to provide different levels of luminous intensity for each color. In this example, four different colors of LEDs are provided with respective switches 24 and respective CLD modules 16. However, it will be appreciated that other numbers of colors can be provided. According to some embodiments, the at least one switch is operated via a string or cord 40 coupled to the connector 26 via one or more sockets 36 to enable convenient control of the luminous intensity and color combinations by pulling on the string or cord 40.

Figure 26:
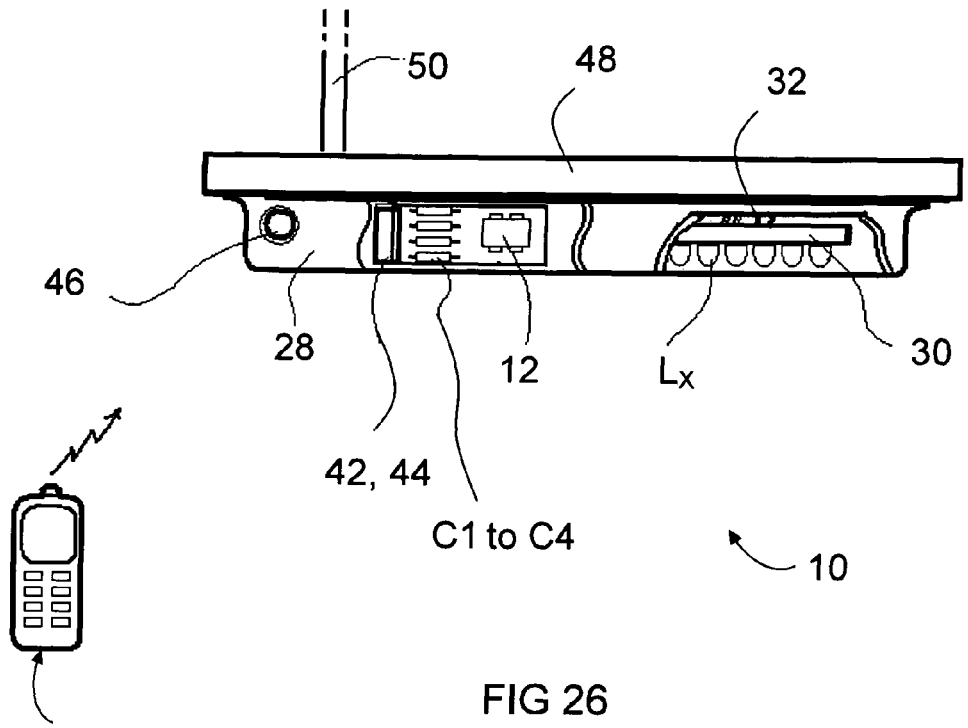
FIG. 26 a schematic drawing of a wirelessly controlled embodiment of the illumination device.

With reference to the embodiment shown in FIG. 26, the illumination device 10 is in an elongate form, such as a tube. The illumination device 10 comprises any of the CLD-based rectifier circuits in accordance with embodiments of the present invention described herein. The illumination device 10 further comprises a digital switching circuit 42 coupled in series with at least one of the CLDs of the CLD module 16 and a wireless transmission circuit 44 coupled to the digital switching circuit 42. The illumination device 10 also comprises a wireless receiver 46 coupled to the wireless transmission circuit 44. The illumination device 10 comprises a transparent housing 28 mounted to a base 48 and the base 48 can be used to mount the illumination device 10 to a surface, such as a ceiling or a wall. A substrate 30 is provided within the housing 28 and a plurality of LEDs ($L_1$ to $L_X$) of one or more LED modules 18 are mounted to the substrate 30. Wires 32 couple the illumination device 10 to an AC power supply 14 via power cable 50. In some embodiments, the base 48 and the housing 28 are an integrally formed unit, such as a box formed of suitable plastics material, wherein a portion of the unit corresponding to the housing 28 is transparent to allow the transmission of light from the LEDs therethrough and a portion of the unit corresponding to the base 48 is opaque.

In the embodiment shown in FIG. 26, one or more of the following can be provided within the housing 28: the full wave rectifier 12; the one or more CLD modules 16; the one or more LED modules 18; the digital switching circuit 42; the wireless transmission circuit 44; the wireless receiver 46.

The illumination device 10 can comprise at least two LED modules 18 and at least two CLD modules 16, with each LED module 18 coupled in series to a respective CLD module 16 and each LED module comprising LEDs ($L_1$ to $L_X$) of a single color. In the example shown in FIG. 26, LED modules 18 comprising red, green, blue and white LEDs are provided. A wireless transmitter 52 is used to transmit signals to the wireless receiver 46 to control the intensity levels and color combinations of the light emitted by the illumination device 10. The wireless transmitter 52 can be provided in a portable controller comprising push-buttons and transmissions can utilize the IRDA protocol described above.

Figure 28:
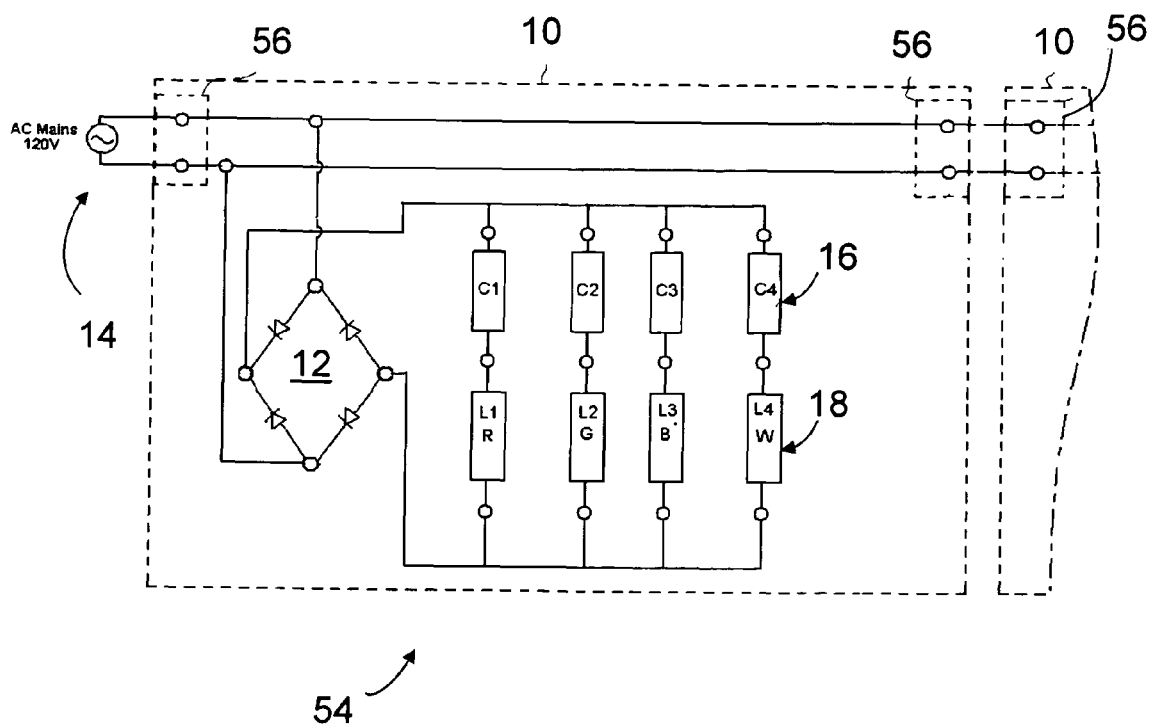
FIG. 28 is a circuit diagram of the illumination system shown in FIG. 27.
Figure 27:
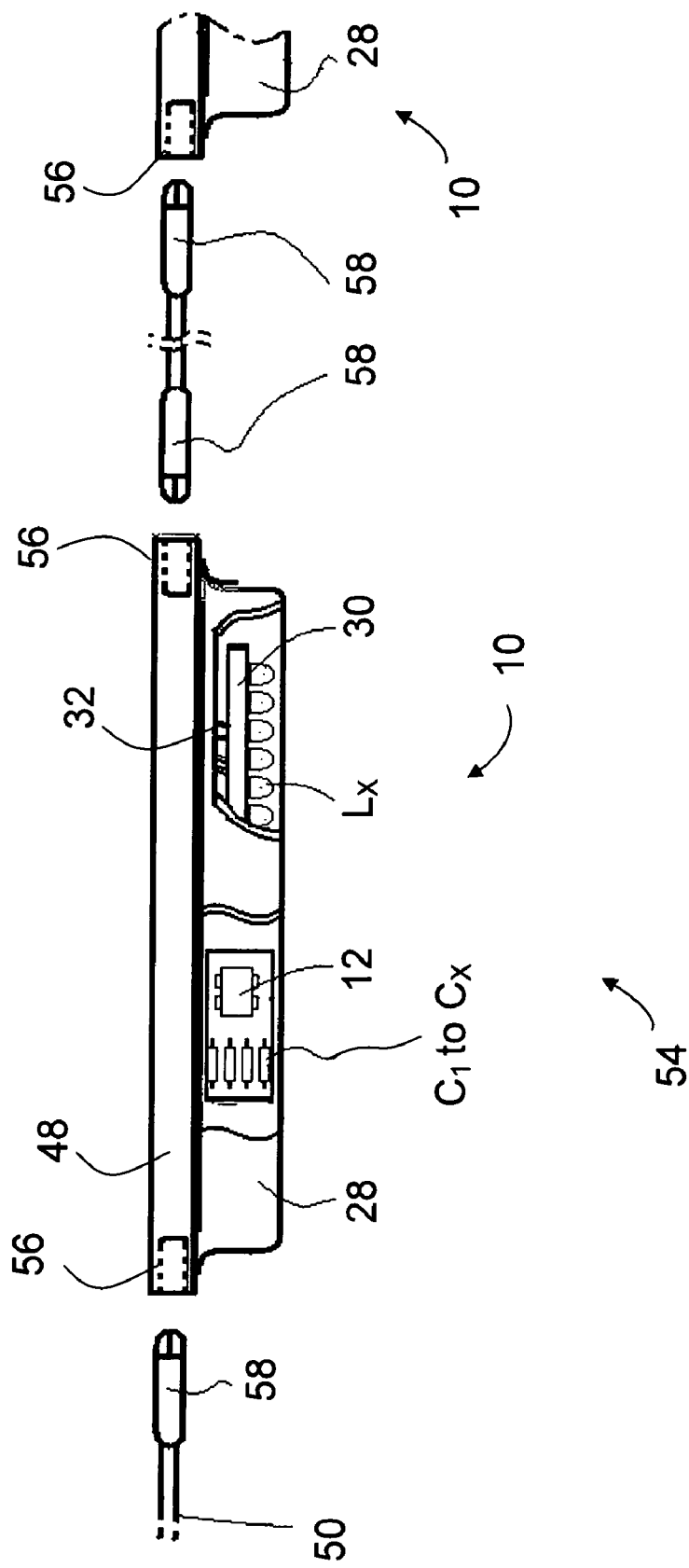
FIG. 27 is a schematic drawing of an illumination system comprising at least two illumination devices in accordance with embodiments of the present invention coupled together.

Referring to FIGS. 27 and 28, an illumination system 54 is provided comprising at least two of the illumination devices 10 as described herein. According to some embodiments of the illumination system 54, each illumination device 10 is in an elongate form, such as a tube or an integrally formed box and is thus similar to the embodiment described above in relation to FIG. 26. FIG. 27 shows two illumination devices 10 to be connected together and FIG. 28 shows an example of a circuit in accordance with an embodiment of the present invention provided within the housing 28 of each illumination device 10. In this example, the circuit in FIG. 28 is the same as that described above in relation to FIG. 21. Each illumination device 10 comprises at least two CLDs ($C_1$ to $C_X$) of at least one CLD module 16 and the full wave rectifier 12 provided within the housing 28. A substrate 30 is provided within the housing 28 and a plurality of LEDs ($L_1$ to $L_X$) of one or more LED modules 18 are mounted on the substrate 30. Wires 32 couple the LEDs ($L_1$ to $L_X$) and the other components to at least two connectors 56, at least one connector 56 provided at each end of the base 48. In the embodiment shown in FIG. 27, each connector 56 is in the form of a female socket for receiving a male connector 58 of a power cable 50, which electrically couples the at least two illumination devices 10.

According to other embodiments of the illumination system 54, each illumination device 10 comprises one of the connectors 56 in the form of a female socket and one of the connectors 56 in the form of a complimentary shaped male plug. This arrangement allows the male plug of a first illumination device 10 to be inserted in the female socket of another illumination device 10 and the female socket of the first illumination device 10 to receive a male plug of another illumination device. The power cable 50 of the previous embodiment is dispensed with and there is a seamless connection between adjacent illumination devices 10.

It is envisaged that multiple illumination devices 10 can be coupled together in such an illumination system 54, which could be used, for example, in corridors of large and small buildings used for domestic, commercial and/or industrial purposes. For example, with a current through each illumination device 10 of about 100 mA, with a 13A mains current, the illumination system 54 can comprise 130 illumination devices 10 connected in series. However, the illumination system 54 can comprise other numbers of illumination devices 10 connected together in alternative configurations.

Hence, the aspects of the present invention as described herein address or at least ameliorate the aforementioned problems associated with known circuit designs for powering LEDs from an AC power supply. The aforementioned advantages of the present invention are achieved by virtue of using the embodiments of the CLD module 16 and the LED module 18 as described herein in series with the output from a full-wave rectifier 12.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. An illumination device comprising:
   a full wave rectifier for converting an alternating current (AC) supply into a direct current (DC);
   a current limiting diode (CLD) module coupled in series to an output of the full wave rectifier, the CLD module comprising at least two CLDs coupled in parallel;
   a light emitting diode (LED) module coupled in series between an output of the CLD module and the full wave rectifier, the LED module comprising a plurality of LEDs; and
   wherein a pulsed (DC) forward current having a truncated waveform is supplied to the LED module.

2. The illumination device of claim 1, wherein the full wave rectifier is a bridge rectifier comprising a single component.

3. The illumination device of claim 1, wherein the full wave rectifier comprises four rectifier diodes in a bridge configuration.

4. The illumination device of claim 1, wherein the LED module comprises at least thirty LEDs in series.

5. The illumination device of claim 1, wherein the LED module comprises one or more LED blocks, each LED block comprising two or more LEDs in parallel.

6. The illumination device of claim 5, wherein each LED block comprises two or more LEDs in series.

7. The illumination device of claim 1, wherein the CLD module comprises at least one switch in series with at least one of the CLDs.

8. The illumination device of claim 7, wherein the at least one switch is a mechanical switch or an electronic switch.

9. The illumination device of claim 1, wherein the sum of a voltage drop across the CLD module and the LED module is at least 90% of the AC supply voltage.

10. The illumination device of claim 1, wherein a number of LEDs in the LED module and a number of CLDs in the CLD module are selected to provide a pulsed forward current having pulses comprising flat peaks for at least 10% of the duration of the power cycle.

11. The illumination device of claim 1, further comprising a positive temperature coefficient (PTC) resettable fuse coupled in series between the AC supply and an input of the full wave rectifier.

12. The illumination device of claim 1, comprising at least two LED modules and at least two CLD modules, each LED module coupled in series to a respective CLD module.

13. The illumination device of claim 12, wherein each LED module comprises LEDs of a single color.

14. The illumination device of claim 1, further comprising:
    a connector for connecting the illumination device to the AC supply;
    a housing coupled to the connector; and
    a substrate coupled to the connector within the housing, the plurality of LEDs mounted on the substrate.

15. The illumination device of claim 14, wherein the at least two CLDs and the full wave rectifier are mounted to the substrate.

16. The illumination device of claim 14, wherein the at least two CLDs and the full wave rectifier are coupled to the connector and are external to the housing.

17. The illumination device of claim 16, further comprising at least one switch in series with at least one of the CLDs, wherein the at least one switch and the CLDs are external to the housing.

18. The illumination device of claim 17, comprising:
    at least two LED modules and at least two CLD modules, each LED module coupled in series to a respective CLD module, each LED module comprising LEDs of a single color; and
    a switch coupled in series with each CLD module.

19. The illumination device of claim 17, wherein the at least one switch is operated via a string or cord coupled to the connector.

20. The illumination device of claim 1, further comprising:
    a digital switching circuit coupled in series with at least one of the CLDs;
    a wireless transmission circuit coupled to the digital switching circuit; and
    a wireless receiver coupled to the wireless transmission circuit.

21. The illumination device of claim 20, wherein one or more of the following are provided within a housing of the illumination device: the full wave rectifier; the CLD module; the LED module; the digital switching circuit; the wireless transmission circuit; the wireless receiver; a substrate.

22. The illumination device of claim 20, comprising at least two LED modules and at least two CLD modules, each LED module coupled in series to a respective CLD module, each LED module comprising LEDs of a single color.

23. An illumination system comprising at least two of the illumination devices of claim 14, wherein each illumination device comprises at least two connectors to electrically couple one of the illumination devices to at least one other illumination device.

24. The illumination system of claim 23, wherein each of the at least two connectors is in the form of a female socket for receiving a male connector of a cable.

25. The illumination system of claim 23, wherein one of the connectors of a first illumination device is in the form of a female socket for receiving a male plug of another illumination device and another of the connectors of the first illumination device is in the form of a male plug for insertion in a female socket of another illumination device.

26. A method of powering an illumination device including:
    converting an alternating current (AC) supply into a direct current (DC) with a full wave rectifier;
    passing the DC into:
        a current limiting diode (CLD) module coupled in series to an output of the full wave rectifier, the CLD module comprising at least two CLDs coupled in parallel; and
    supplying a pulsed forward current having a truncated waveform to a light emitting diode (LED) module coupled in series between an output of the CLD module and the full wave rectifier, the LED module comprising a plurality of LEDs.

27. The method of claim 26, including controlling illumination provided by the LED module with at least one switch in series with at least one of the CLDs in the CLD module.

28. The method of claim 26, including selecting a number of LEDs in the LED module and a number of CLDs in the CLD module to provide a pulsed forward current, the pulsed forward current having pulses comprising flat peaks for at least 10% of the duration of the current cycle.

* * * * *